US011960047B1

(12) United States Patent
Olsson et al.

(10) Patent No.: US 11,960,047 B1
(45) Date of Patent: *Apr. 16, 2024

(54) LOCATING DEVICES, SYSTEMS, AND METHODS USING FREQUENCY SUITES FOR UTILITY DETECTION

(71) Applicant: SeeScan, Inc., San Diego, CA (US)

(72) Inventors: Mark S. Olsson, La Jolla, CA (US); Stephanie M. Bench, Sandersville, GA (US); Michael J. Martin, San Diego, CA (US); Ray Merewether, La Jolla, CA (US); Paul Wisecaver, San Diego, CA (US); Austin Rutledge, San Diego, CA (US)

(73) Assignee: SEESCAN, INC., San Diego, CA (US)

(*) Notice: Subject to any disclaimer, the term of this patent is extended or adjusted under 35 U.S.C. 154(b) by 14 days.

This patent is subject to a terminal disclaimer.

(21) Appl. No.: 17/379,867

(22) Filed: Jul. 19, 2021

Related U.S. Application Data

(63) Continuation of application No. 16/902,245, filed on Jun. 15, 2020, now Pat. No. 11,073,632, which is a
(Continued)

(51) Int. Cl.
*G06F 11/30* (2006.01)
*G01V 3/08* (2006.01)
(Continued)

(52) U.S. Cl.
CPC .............. *G01V 3/081* (2013.01); *G01B 7/26* (2013.01); *G01V 3/15* (2013.01); *G01V 3/38* (2013.01)

(58) Field of Classification Search
CPC .................................................... G01V 3/081
See application file for complete search history.

(56) References Cited

U.S. PATENT DOCUMENTS

| 6,411,073 | B1 | 6/2002 | Fischer et al. |
| 7,042,224 | B2 * | 5/2006 | Fujiwara ............. G01V 3/15 |
| | | | 342/22 |

(Continued)

FOREIGN PATENT DOCUMENTS

WO   WO2010-039242   4/2010

OTHER PUBLICATIONS

International Searching Authority, "Written Opinion of the International Searching Authority" for PCT Patent Application No. PCT/US2016/048774, dated Mar. 2, 2017, European Patent Office, Munich.

(Continued)

*Primary Examiner* — Phuong Huynh
(74) *Attorney, Agent, or Firm* — Steven C. Tietsworth, Esq.; Michael J. Pennington, Esq.

(57) ABSTRACT

A method for locating buried utilities in a utility locator is disclosed. The method may include receiving, at an antenna array for receiving magnetic field signals, a plurality of magnetic field signals at predefined signal frequencies in a predefined frequency suite, generating, in a receiver coupled to an output of the antenna array, a first receiver output signal, generating, in a processing element coupled to the receiver, a first set of data associated with the two or more signal components, and storing, in a non-transitory memory of the locator, the first set of data.

7 Claims, 21 Drawing Sheets

Related U.S. Application Data continuation of application No. 15/247,503, filed on Aug. 25, 2016, now Pat. No. 10,690,795.

(60) Provisional application No. 62/209,824, filed on Aug. 25, 2015.

(51) Int. Cl.
*G01V 3/15* (2006.01)
*G01B 7/26* (2006.01)
*G01V 3/38* (2006.01)

(56) References Cited

U.S. PATENT DOCUMENTS

| | | | |
|---|---|---|---|
| 7,339,379 B2 | 3/2008 | Thompson et al. | |
| 8,773,133 B1 * | 7/2014 | Olsson | G01V 3/081 |
| | | | 702/76 |
| 10,690,795 B2 * | 6/2020 | Olsson | G01V 3/38 |
| 11,073,632 B1 * | 7/2021 | Olsson | G01B 7/26 |
| 2004/0070399 A1 | 4/2004 | Olsson et al. | |
| 2005/0156600 A1 | 7/2005 | Olsson et al. | |
| 2006/0178849 A1 * | 8/2006 | Maier | G01V 3/12 |
| | | | 702/66 |
| 2011/0112787 A1 * | 5/2011 | Daw | G01V 3/15 |
| | | | 702/95 |
| 2013/0127470 A1 * | 5/2013 | Olsson | G01V 3/15 |
| | | | 324/326 |
| 2014/0312903 A1 | 10/2014 | Olsson et al. | |

OTHER PUBLICATIONS

European Patent Office, "European Search Report" for Application No. EP 22 15 3063, dated Aug. 4, 2022, European Patent Office, Munich.

* cited by examiner

LOCATING DEVICES, SYSTEMS, AND METHODS USING FREQUENCY SUITES FOR UTILITY DETECTION

CROSS-REFERENCE TO RELATED APPLICATIONS

This application is a continuation of and claims priority to U.S. Utility patent application Ser. No. 16/902,245, entitled LOCATING DEVICES, SYSTEMS, AND METHODS USING FREQUENCY SUITES FOR UTILITY DETECTION, filed Jun. 15, 2020, which is a continuation of and claims priority to U.S. Utility patent application Ser. No. 15/247,503, now U.S. Pat. No. 10,690,795, entitled LOCATING DEVICES, SYSTEMS, AND METHODS USING FREQUENCY SUITES FOR UTILITY DETECTION, filed Aug. 25, 2016, which claims priority under 35 U.S.C. § 119(e) to U.S. Provisional Patent Application Ser. No. 62/209,824, entitled COMBINED PASSIVE AND ACTIVE UTILITY LOCATING DEVICES, SYSTEMS, AND METHODS, filed Aug. 25, 2015. The content of each of these applications is hereby incorporated by reference herein in its entirety for all purposes.

FIELD

This disclosure relates generally to utility locating devices, systems, and methods for locating buried or otherwise hidden utilities or other conductors by sensing magnetic field signals emitted from the utilities or other conductors. More specifically, but not exclusively, it relates to devices, systems, and methods for locating buried utilities by sensing magnetic field signals emitted from both passive and actively coupled current signal sources.

BACKGROUND

Incidents caused by inaccurately located utility lines have resulted in costly damage to infrastructure as well as loss of human life. In a traditional utility line locating operation (also denoted herein as a "locate" for brevity), a user moves about a locate area with a hand-held utility locator device (also denoted herein as a "utility locator" or simply "locator" for brevity) to detect magnetic field signals emanating from utility lines and/or other conductors hidden or buried underground. Existing locators are typically configured to detect either signals resulting from current signals intentionally coupled to the utility line (denoted herein as "active signals"), such as with a transmitter device, or "passive signals," which are signals resulting from currents incidentally induced upon the utility from overhead utility lines, radio sources (e.g., from broadcast antennas or other signal sources), or other electromagnetic signal sources. Traditional locating uses one or the other type, but typical not both simultaneously.

Accordingly, there is a need in the art to address the above-described as well as other problems.

SUMMARY

In exemplary embodiments, combined passive and active signal locating devices, systems, and methods of the present disclosure may include a utility locator for receiving and processing electromagnetic signals at multiple frequencies simultaneously and generating locating output data based on the processed plurality of signals. These may include one or more active and one or more passive signal suites or one or more suites of both active and passive signal frequencies. The signals may include one or more active signals coupled to the utility using one or more utility transmitters and/or one or more passive signals resulting from currents induced or coupled from signal sources within the locate environment such as power lines, radio broadcast stations, or other sources.

This disclosure relates to devices, systems, and methods for locating buried utilities using both active magnetic field signals, those signals coupled to the utility using one or more utility transmitters, and passive magnetic field signals, those signals which may incidentally be induced from signal sources within the locate environment, emitted from the utilities or other buried assets. The combined passive and active signal locating devices, systems, and methods of the present disclosure may include a utility locator for receiving and processing electromagnetic signals at multiple frequencies which may include fundamental frequencies and harmonic frequencies simultaneously and independently. The signals may be collected with a suite of two or more signals, typically harmonics or related by integer factors. Such signal suites may include odd harmonics or even harmonics or both.

The systems, devices, and methods herein may use comparison of solutions at different geographical locations within the locate operation to allow for a refined determination of location, depth, and/or type of utility/utilities and/or other conductors. In some embodiments, the comparison may be or include principal component analysis (PCA) independent component analysis (ICA), and/or other component analysis or correlation methods.

For example, in one aspect the disclosure relates to a buried utility locator. The locator may include, for example, an antenna array for receiving magnetic field signals from a buried utility in two or more orthogonal directions, the antenna array having a bandwidth including a plurality of predefined signal frequencies in a predefined first frequency suite, a receiver operatively coupled to the antenna array for generating a receiver output signal including amplitude and/or phase information of first two or more signal components in two or more simultaneously received signals of the first frequency suite, a processing element operatively coupled to the receiver for receiving the receiver output signal and generating a first set of data associated with the two or more signal components of the first frequency suite, a non-transitory memory for storing the first set of data, and a display to render a visual output corresponding to the determined first set of data.

In another aspect, the disclosure relates to a method for locating buried utilities. The method may include, for example, receiving, at an antenna array for receiving magnetic field signals from a buried utility in two or more orthogonal directions, a plurality of magnetic field signals at predefined signal frequencies in a predefined first frequency suite, generating, in a receiver coupled to an output of the antenna array, a receiver output signal including amplitude and/or phase information of first two or more signal components in two or more simultaneously received signals of the first frequency suite, generating, in a processing element coupled to the receiver, a first set of data associated with the two or more signal components of the first frequency suite, storing, a non-transitory memory of the locator, the first set of data, and rendering, on a display of the locator, a visual output corresponding to the determined first set of data.

The combined passive and active locating devices, systems, and methods herein may be used in mapping utility lines and/or other like assets.

In another aspect, the disclosure relates to means for implementing the above devices and methods.

In another aspect, the disclosure relates to a non-transitory computer medium including instructions for use by a processing element to implement the above-described methods, in whole or in part.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1A:
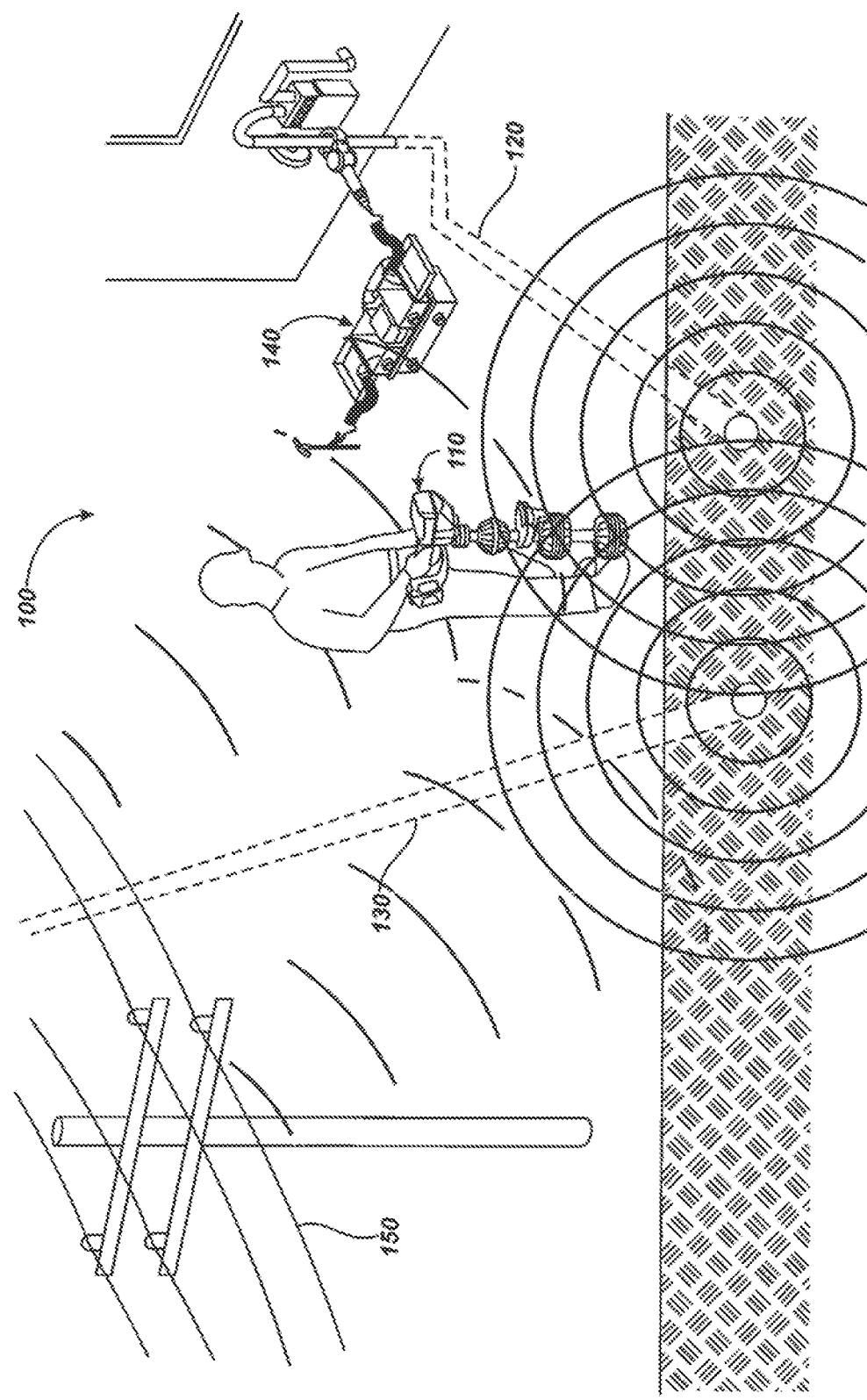
FIG. 1A an illustration of details of an example utility locating operation.

In exemplary embodiments, combined passive and active signal locating devices, systems, and methods of the present disclosure may include a utility locator for receiving and processing electromagnetic signals at multiple frequencies simultaneously and generating locating output data based on the processed plurality of signals. These may include one or more active and one or more passive signal suites or one or more suites of both active and passive signal frequencies. The signals may include one or more active signals coupled to the utility using one or more utility transmitters and/or one or more passive signals resulting from currents induced or coupled from signal sources within the locate environment such as power lines, radio broadcast stations, or other sources.

As used herein, an "active signal(s)" refers to a magnetic field signal (magnetic component of an electromagnetic field created by a flowing current) resulting from a current intentionally impressed upon a hidden or buried utility line (e.g. a pipe, conduit, cable, etc.) or other conductive object (e.g., a non-conductive utility such as a plastic pipe may have an associated tracer wire or other conductor buried with it to facilitate locating it) that is being located with a utility locator. Such an active signal is typically generated with a utility transmitter device or induction device, such as an induction stick or clamp, or with another transmitting element with a direct or inductive coupler that intentionally induces, directly couples, or otherwise impresses a current signal at one or more predetermined frequencies onto one or more utility lines and/or other conductors. Locating operations that use locators to sense active signals for locating pipes or other conductors may be referred to as "active locating" for brevity.

The term "passive signal(s)" refers to those signals not purposefully impressed onto utility lines and/or other conductive objects but rather induced or otherwise coupled through sources in the environment such as radio signals, power line transmission cables (and their associated electromagnetic signals), and the like. Such passive signals may, for example, may result from electromagnetic field coupling with overhead power lines, radio station signals, cellular or other terrestrial wireless signals, other radio signals, and/or other signal generating elements that produce signals that couple onto utility lines and/or other conductive objects within the locate area. Passive signals may also include electromagnetic fields generated by currents intentionally impressed onto hidden or buried conductors, such as from buried AC power lines or other current signal sources that are not applied to the conductors as part of a locate operation using a transmitter or other current coupling device. Locating operations that use locators to sense passive signals for locating pipes or other conductors may be referred to as "active locating" for brevity.

The term "spectral scan" as used herein refers to an array signal measurements taken at various individual frequencies of a frequency suite simultaneously. The resulting array values may be represented as amplitudes, amplitudes and phases, vector data, or other signal representations. The spectral scan may be done by processing a wideband signal having a bandwidth that extends over two or more frequencies (preferably all frequencies) of a frequency suite to extract information about separate signal components. For example, the wideband signal may be processed, such as by using a discrete Fourier transform (DFT) (or other signal processing techniques, such as parallel narrowband signal processing, other transform methods, and the like) to simultaneously extract discrete frequency signals from the component signals of the frequency suites.

The term "buried objects" and "buried utilities" as used herein includes objects located inside walls, between floors in multi-story buildings or cast into concrete slabs, for example, as well as objects below the surface of the ground, such as pipes or other conductors buried below the ground surface or under roadways, etc. In a typical application a buried object or buried utility is a pipe, cable, conduit, wire, or other object buried under the ground surface, at a depth of from a few centimeters to meters or more, that a user, such as a utility company, construction company, homeowner, or others wish to locate, map (e.g., by surface position as defined by latitude/longitude or other surface coordinates, and/or also by depth), and/or provide a corresponding mark of on the ground surface using paint or other markers.

The term "exemplary" as used herein means "serving as an example, instance, or illustration." Any aspect, detail, function, implementation, and/or embodiment described herein as "exemplary" is not necessarily to be construed as preferred or advantageous over other aspects and/or embodiments The measurements may be a vector, gradient, and/or combined vector/gradient solution with magnitude, direction, and phase measurements for each frequency. Such a solution may include a measurement of magnitude, direction, and/or phase at each frequency as a function of both time and position. The simultaneously determined locate data may be presented on a display or other output device separately for each of two or more frequencies, may be presented in combination, such as by using a single representation of locate data determined from a particular suite or set of frequencies in a suite, and/or may be stored in a non-transitory memory or communicated to another locate system device or remove system or device.

As described in further detail subsequently herein, processing of received active and passive signals may be used to determine location and/or depth of one or more utilities as well as other utility information such as type of utility line detected within the ground, with the determined location and/or depth information based on a plurality of signals at different frequencies in either active frequency suites, passive frequency suites, or combinations thereof.

Additional details of utility locator devices, transmitter devices, and other associated devices that may be used in embodiments in conjunction with the disclosures herein are described in co-assigned patent and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,498,797, issued Mar. 3, 2009, entitled LOCATOR WITH CURRENT-MEASURING CAPABILITY; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,825,647, issued Nov. 2, 2010, entitled METHOD FOR LOCATING BURIED PIPES AND CABLES; U.S. patent application Ser. No. 12/939,591, filed Nov. 4, 2010, entitled SMART PERSONAL COMMUNICATION DEVICES AS USER INTERFACES; U.S. patent application Ser. No. 12/947,503, filed Nov. 16, 2010, entitled IMAGE-BASED MAPPING LOCATING SYSTEM; U.S. Pat. No. 7,863,885, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. patent application Ser. No. 13/356,408, filed Jan. 23, 2012, entitled SONDES AND METHODS FOR USE WITH BURIED LINE LOCATOR SYSTEMS; U.S. Pat. No. 8,106,660, issued Jan. 31, 2012, entitled SONDE ARRAY FOR USE WITH BURIED LINE LOCATORS; U.S. patent application Ser. No. 13/493,883, issued Jun. 11, 2012, entitled MAGNETIC SENSING BURIED OBJECT LOCATOR INCLUDING A CAMERA; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. patent application Ser. No. 13/570,211, filed Aug. 8, 2012, entitled PHASE SYNCHRONIZED BURIED OBJECT LOCATOR APPARATUS, SYSTEMS, AND METHODS; U.S. patent application Ser. No. 13/584,799, issued Aug. 13, 2012, entitled BURIED OBJECT LOCATOR SYSTEMS AND METHODS; U.S. patent application Ser. No. 13/602,303, filed Sep. 3, 2012, entitled WIRELESS BURIED PIPE AND CABLE LOCATING SYSTEMS; U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/793,168, filed Mar. 3, 2013, entitled BURIED OBJECT LOCATORS WITH CONDUCTIVE ANTENNA BOBBINS; U.S. patent application Ser. No. 13/787,711, filed Mar. 6, 2013, entitled DUAL SENSED LOCATING SYSTEMS AND METHODS; U.S. patent application Ser. No. 13/841,879, filed Mar. 15, 2013, entitled GROUND-TRACKING SYSTEMS AND APPARATUS; U.S. patent application Ser. No. 13/850,181, filed Mar. 25, 2013, entitled GRADIENT ANTENNA COILS AND ARRAYS FOR USE IN LOCATING SYSTEMS; U.S. patent application Ser. No. 13/851,951, filed Mar. 27, 2013, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 14/022,067, filed Sep. 9, 2013, entitled USER INTERFACES FOR UTILITY LOCATORS; U.S. patent application Ser. No. 14/080,582, filed Nov. 14, 2013, entitled MULTI-FREQUENCY LOCATING SYSTEMS AND METHODS; U.S. Pat. No. 8,547,428, issued Oct. 1, 2013, entitled PIPE MAPPING SYSTEM; U.S. patent application Ser. No. 14/053,401, filed Oct. 14, 2013, entitled BURIED OBJECT LOCATING DEVICES AND METHODS; U.S. patent application Ser. No. 14/148,649, filed Jan. 6, 2014, entitled MAPPING LOCATING SYSTEMS AND METHODS; U.S. patent application Ser. No. 14/154,128, filed Jan. 13, 2014, entitled UTILITY LOCATOR SYSTEMS AND METHODS; U.S. patent application Ser. No. 14/179,538, filed Feb. 12, 2014, entitled OPTICAL GROUND TRACKING APPARATUS, SYSTEMS, AND METHODS; U.S. patent application Ser. No. 14/207,502, filed Mar. 12, 2014, entitled GRADIENT ANTENNA COILS AND ARRAYS FOR USE IN LOCATING SYSTEMS; U.S. patent application Ser. No. 14/210,251, filed Mar. 13, 2014, entitled MULTI-FREQUENCY LOCATING SYSTEMS AND METHODS; U.S. patent application Ser. No. 14/215,290, filed Mar. 17, 2014, entitled SONDE DEVICES INCLUDING A SECTIONAL FERRITE CORE; U.S. patent application Ser. No. 14/229,813, filed Mar. 28, 2014, entitled UTILITY LOCATOR TRANSMITTER APPARATUS AND METHODS; U.S. patent application Ser. No. 14/321,699, filed Jul. 1, 2014, entitled UTILITY LOCATOR APPARATUS, SYSTEMS, AND METHODS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,279, filed Jul. 29, 2014, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. patent application Ser. No. 14/584,996, filed Dec. 29, 2014, entitled OPTICAL GROUND TRACKING METHODS AND APPARATUS FOR USE WITH BURIED UTILITY LOCATORS; U.S. Provisional Patent Application 62/107,985, filed Jan. 26, 2015, entitled SELF-STANDING MULTI-LEG ATTACHMENT DEVICES FOR USE WITH UTILITY LOCATORS; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/800,490, filed Jul. 15, 2015, entitled UTILITY LOCATOR TRANSMITTER DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled MARKING PAINT APPLICATOR FOR PORTABLE LOCATOR; U.S. Provisional Patent Application 62/244,658, filed Oct. 21, 2015, entitled SIGNAL KEYING UTILITY LOCATING DEVICES, SYSTEMS, AND METHODS; U.S. patent application Ser. No. 14/949,868, filed Nov. 23, 2015, entitled BURIED OBJECT LOCATOR APPARATUS AND SYSTEMS; U.S. Provisional Patent Application 62/260,199, filed Nov. 25, 2015, UTILITY LOCATING SYSTEMS, DEVICES, AND METHODS USING RADIO BROADCAST SIGNALS. The content of each of the above-described applications is hereby incorporated by reference herein in its entirety. The above applications may be collectively denoted herein as the "co-assigned applications" or "incorporated applications".

In one aspect, the systems, methods, and devices of the present disclosure may receive and measure magnetic field signals resulting from current flow in a buried utility at fundamental frequencies and harmonic frequencies simultaneously and independently. The multiple frequency signals may be from one or more active and/or passive signals. The signals may be collected within a suite of two or more signals. In an exemplary embodiment a suite includes fundamentals and harmonics or other signals related by integer factors. Each fundamental frequency and harmonic frequency thereof may be simultaneously and individually measured by a utility locator to produce a vector, gradient, and/or combined vector/gradient solution for each determined location and depth of a utility or utilities within the ground. For example, two or more solutions for a determined depth may be determined simultaneously and independently for a power line signal at 60 Hz and one or more of its harmonics (or, omitting the fundamental at 60 Hz, two or more harmonics may be used to independently determine depth, vector, gradient, or other information about the utility).

Such a solution may include a measurement of magnitude, direction, and/or phase at each frequency as a function of both time and position. The simultaneously determined locate data may be presented on a display or displays separately for each of two or more frequencies, may be presented in combination, such as by using a single representation of locate data determined from a particular suite or set of frequencies in a suite, and/or may be stored in a non-transitory memory or communicated to another locate system device or remove system or device for remote analysis, display/rendering, printing, and/or storage.

In another aspect, the systems, devices, and methods herein may use a comparison of solutions at different geographical locations within the locate operation to allow for a refined determination of location, depth, and/or type of utility/utilities and/or other conductors. In some embodiments, the comparison may be or may include principal component analysis (PCA), independent component analysis (ICA), and/or other component analysis or correlation methods as are known or developed in the art.

In another aspect, systems, methods, and devices of the present disclosure may be tuned to receive and process magnetic field signals at power line frequencies (e.g., 50 or 60 Hz, or other AC power frequencies as may be used in alternate power supply systems) and harmonics thereof.

In another aspect, systems, methods, and devices of the present disclosure may be processed in conjunction with the locator receiver processing and/or other processing being phase locked to an AC power grid or other frequency reference.

In another aspect, systems, methods, and devices of the present disclosure may process received signals to separate out odd and even harmonics magnetic field signals (e.g., such as odd and even harmonics of power line signals or other signals flowing in a hidden or buried conductor/utility). Ratios of odd and even harmonic frequencies may be used, such as through ratios, spectral signatures, and other processing mechanisms to determine location, depth, and/or utility type.

In another aspect, systems, devices, and methods herein may use predetermined sets and groupings of harmonics in frequency suites, which may be used to determine location, depth, and/or utility type.

In another aspect, systems, devices, and methods herein may use correlations/patterns of harmonics to refine location, depth, and/or utility type.

In another aspect, systems, devices, and methods herein may measure phase of one or more signals. In some such embodiments, relative and/or absolute phase may be determined with respect to reference phases at a phase reference point or at or relative to a locate position or other reference.

In another aspect, systems and devices herein may implement methods for adjusting filter bandwidth and/or averaging of filter output signals in utility locator signal processing circuitry based upon movement of the utility locator and/or other criteria determined during a locate operation.

In another aspect, systems, devices, and methods herein may perform an initial spectral scan of a locate area and/or utilize prior spectral scan data within a current locate operation to compare with present and/or additional spectral scan data.

In another aspect, systems, devices, and methods described herein may be used in mapping of utility lines and systems, such as in combination with utility mapping embodiments described in the incorporated applications.

In another aspect the disclosure relates to a buried utility locator. The locator may include, for example, an antenna array for receiving magnetic field signals from a buried utility in two or more orthogonal directions, the antenna array having a bandwidth including a plurality of predefined signal frequencies in a predefined first frequency suite, a receiver operatively coupled to the antenna array for generating a receiver output signal including amplitude and/or phase information of first two or more signal components in two or more simultaneously received signals of the first frequency suite, a processing element operatively coupled to the receiver for receiving the receiver output signal and generating a first set of data associated with the two or more signal components of the first frequency suite, a non-transitory memory for storing the first set of data, and a display to render a visual output corresponding to the determined first set of data.

The first frequency suite may, for example, be a passive frequency suite including signal components at two or more passive frequencies, and the first set of data may be based on the two or more passive frequency signal components. The first frequency suite may be active frequency suite including signal components at two or more active frequencies, and the first set of data is may be based on the two or more active frequency signal components. The first frequency suite may include a signal component at a passive frequency and a signal component at an active frequency, and the first set of data may be based on the passive frequency signal component and the active frequency signal component.

The antenna array may, for example, have a bandwidth that includes a second plurality of frequencies in a second frequency suite, the receiver may generate the output signal to include second two or more signal components in two or more frequencies in the second frequency suite, the processing element may generate a second set of data associated with the second two or more signal components, and the second set of data may be stored in the non-transitory memory.

The first frequency suite may, for example, be an active frequency suite including signal components at two or more active frequencies, and the first set of data may be based on the two or more active frequency signal components. The first frequency suite may be an active frequency suite including signal components at two or more active frequencies, and the first set of data may be based on the two or more active frequency signal components.

The second frequency suite may, for example, be a passive frequency suite including signal components at two or more passive frequencies, and the second set of data may be based on the two or more passive frequency signal components.

The first frequency suite may, for example, include a signal component at a passive frequency and a signal component at an active frequency, and the first set of data may be based on the passive frequency signal component and the active frequency signal component.

The second frequency suite may, for example, include a signal component at a passive frequency and a signal component at an active frequency, and the second set of data may be based on the passive frequency signal component and the active frequency signal component.

The information associated with the buried utility may, for example, be based on the two or more signal components of the first frequency suite is rendered on the display.

The locator may for example, further include a module for generating positional information of the locator, wherein the positional information of the locator is associated with the two or more signal components and stored in the non-transitory memory. The module for generating positional information may be a GPS or other satellite or terrestrial receiver module and the positional information is latitude and longitude information. The module may be an inertial sensing module.

The generated data associated with the two or more signal components of the first frequency suite may, for example, include separate depth information of the buried utility determined based on ones of the two or more signal components. The generated data associated with the two or more signal components of the first frequency suite may include separate positional information of the buried utility relative to the locator determined based on ones of the two or more signal components. The generated data associated with the first two or more signal components and the second two or more signal components may include separate depth information of the buried utility determined based on ones of the first two or more signal components and ones of the second two or more signal components. The generated data associated with the first two or more signal components and the second two or more signal components may include separate position information of the buried utility determined based on ones of the first two or more signal components and ones of the second two or more signal components. The process of generating data associated with the two or more signals of the plurality of frequencies may include generating the data using a discrete Fourier transform (DFT) on the receiver output signal to extract amplitude and/or phase information from ones of the signals of the plurality of frequencies.

The plurality of frequencies of the first frequency suite may, for example, be passive signals based on a fundamental and/or harmonics of a power line frequency. The power line frequency may be 50 Hz or 60 Hz. The plurality of frequencies of the first frequency suite may be active signals based on a fundamental and/or harmonics of a utility transmitter output signal directly or inductively coupled to the buried utility.

The first set of data associated with the two or more signal components may, for example, be associated with a first utility of the one or more buried utilities, and the first set of data may be presented on the display as a single linear element corresponding to the first utility. The data from the first set of data may be averaged or otherwise combined to generate the single linear element on the display. The display may include a rendered map or image of the locate area and the two or more linear elements may be superimposed on the map. The map may be a raster or vector based map or may be another image or graphic representing the locate area.

The first set of data associated with the two or more signal components may be associated with a first utility of the one or more buried utilities, and the first set of data may be presented on the display as two or more separate linear elements corresponding to a representation of the utility based on simultaneously received and processed data corresponding to the two or more signal components. The display may include a rendered map or image of the locate area and the two or more linear elements may be superimposed on the map. The map may be a raster or vector based map or may be another image or graphic representing the locate area.

The first set of data associated with the two or more signal components may be associated with a first utility of the one or more buried utilities, the second set of data associated with the second two or more signal components may be associated with a second utility of the one or more buried utilities, the first set of data may be presented on the display as one or more linear elements corresponding to the first utility, and the second set of data may be presented on the display as one or more linear elements corresponding to the second utility. The display may include a rendered map or image of the locate area and the two or more linear elements may be superimposed on the map. The map may be a raster or vector based map or may be another image or graphic representing the locate area.

A spectral signature may, for example, be determined from the first set of data, and a first utility type may be determined based on comparison of the determined spectral signature and a reference spectral signature. The first utility type may be determined to be a water line. The first utility type may be determined to be an AC power line.

In another aspect, the disclosure relates to a method for locating buried utilities. The method may include, for example, receiving, at an antenna array for receiving magnetic field signals from a buried utility in two or more orthogonal directions, a plurality of magnetic field signals at predefined signal frequencies in a predefined first frequency suite, generating, in a receiver coupled to an output of the antenna array, a receiver output signal including amplitude and/or phase information of first two or more signal components in two or more simultaneously received signals of the first frequency suite, generating, in a processing element coupled to the receiver, a first set of data associated with the two or more signal components of the first frequency suite, storing, a non-transitory memory of the locator, the first set of data, and rendering, on a display of the locator, a visual output corresponding to the determined first set of data.

The first frequency suite may, for example, be a passive frequency suite including signal components at two or more passive frequencies, and the first set of data may be based on the two or more passive frequency signal components. The first frequency suite may be active frequency suite including signal components at two or more active frequencies, and the first set of data is may be based on the two or more active frequency signal components. The first frequency suite may include a signal component at a passive frequency and a signal component at an active frequency, and the first set of data may be based on the passive frequency signal component and the active frequency signal component.

The antenna array may, for example, have a bandwidth that includes a second plurality of frequencies in a second frequency suite, the receiver may generate the output signal to include second two or more signal components in two or more frequencies in the second frequency suite, the processing element may generate a second set of data associated with the second two or more signal components, and the second set of data may be stored in the non-transitory memory.

The first frequency suite may, for example, be an active frequency suite including signal components at two or more active frequencies, and the first set of data may be based on the two or more active frequency signal components. The first frequency suite may be an active frequency suite including signal components at two or more active frequencies, and the first set of data may be based on the two or more active frequency signal components.

The second frequency suite may, for example, be a passive frequency suite including signal components at two or more passive frequencies, and the second set of data may be based on the two or more passive frequency signal components.

The first frequency suite may, for example, include a signal component at a passive frequency and a signal component at an active frequency, and the first set of data may be based on the passive frequency signal component and the active frequency signal component.

The second frequency suite may, for example, include a signal component at a passive frequency and a signal component at an active frequency, and the second set of data may be based on the passive frequency signal component and the active frequency signal component.

The information associated with the buried utility may, for example, be based on the two or more signal components of the first frequency suite is rendered on the display.

The method may further include generating positional information of the locator, wherein the positional information of the locator is associated with the two or more signal components and stored in the non-transitory memory. The module for generating positional information may be a GPS or other satellite or terrestrial receiver module and the positional information is latitude and longitude information. The module may be an inertial sensing module.

The generated data associated with the two or more signal components of the first frequency suite may, for example, include separate depth information of the buried utility determined based on ones of the two or more signal components. The generated data associated with the two or more signal components of the first frequency suite may include separate positional information of the buried utility relative to the locator determined based on ones of the two or more signal components. The generated data associated with the first two or more signal components and the second two or more signal components may include separate depth information of the buried utility determined based on ones of the first two or more signal components and ones of the second two or more signal components. The generated data associated with the first two or more signal components and the second two or more signal components may include separate position information of the buried utility determined based on ones of the first two or more signal components and ones of the second two or more signal components. The process of generating data associated with the two or more signals of the plurality of frequencies may include generating the data using a discrete Fourier transform (DFT) on the receiver output signal to extract amplitude and/or phase information from ones of the signals of the plurality of frequencies.

The plurality of frequencies of the first frequency suite may, for example, be passive signals based on a fundamental and/or harmonics of a power line frequency. The power line frequency may be 50 Hz or 60 Hz. The plurality of frequencies of the first frequency suite may be active signals based on a fundamental and/or harmonics of a utility transmitter output signal directly or inductively coupled to the buried utility.

The first set of data associated with the two or more signal components may, for example, be associated with a first utility of the one or more buried utilities, and the first set of data may be presented on the display as a single linear element corresponding to the first utility. The data from the first set of data may be averaged or otherwise combined to generate the single linear element on the display. The display may include a rendered map or image of the locate area and the two or more linear elements may be superimposed on the map. The map may be a raster or vector based map or may be another image or graphic representing the locate area.

The first set of data associated with the two or more signal components may be associated with a first utility of the one or more buried utilities, and the first set of data may be presented on the display as two or more separate linear elements corresponding to a representation of the utility based on simultaneously received and processed data corresponding to the two or more signal components. The display may include a rendered map or image of the locate area and the two or more linear elements may be superimposed on the map. The map may be a raster or vector based map or may be another image or graphic representing the locate area.

The first set of data associated with the two or more signal components may be associated with a first utility of the one or more buried utilities, the second set of data associated with the second two or more signal components may be associated with a second utility of the one or more buried utilities, the first set of data may be presented on the display as one or more linear elements corresponding to the first utility, and the second set of data may be presented on the display as one or more linear elements corresponding to the second utility. The display may include a rendered map or image of the locate area and the two or more linear elements may be superimposed on the map. The map may be a raster or vector based map or may be another image or graphic representing the locate area.

A spectral signature may, for example, be determined from the first set of data, and a first utility type may be determined based on comparison of the determined spectral signature and a reference spectral signature. The first utility type may be determined to be a water line. The first utility type may be determined to be an AC power line.

The combined passive and active locating devices, systems, and methods herein may be used in mapping utility lines and/or other like assets.

In another aspect, the disclosure relates to means for implementing the above devices and methods.

In another aspect, the disclosure relates to non-transitory computer medium including instructions for use by a processing element to implement the above-described methods, in whole or in part.

Various additional aspects, features, and functions are described below in conjunction with FIGS. 1A through 20B of the appended Drawings.

It is noted that the following exemplary embodiments are provided for the purpose of illustrating examples of various aspects, details, and functions of apparatus, methods, and systems for locating buried or hidden objects; however, the described embodiments are not intended to be in any way limiting. It will be apparent to one of ordinary skill in the art that various aspects may be implemented in other embodiments within the spirit and scope of the present disclosure.

EXAMPLE EMBODIMENTS

At any given time, a user doing a traditional locate operation (i.e., a user walking around over a ground surface with a utility locator in search of buried utilities) uses either active signals or passive signals for finding buried utilities, but typically not both at the same time or in conjunction with each other. Likewise, traditional locate operations typically use only a single signal at a single frequency at any given time. However, as described herein, additional potential signal detection and processing functionality can be used by combined simultaneous processing of both types of signals to synergistically improve locate performance and/or by combined simultaneous processing of fundamental signals and their harmonics.

Combined passive and active locating system embodiments in accordance with aspects of the present disclosure may include a utility locator for simultaneously receiving and processing magnetic field signal components emitted from a buried utility at multiple frequencies. Such signals may include magnetic field signals resulting from currents intentionally impressed on a utility line from a transmitter device ("active signals") as well as magnetic field signals resulting from currents incidentally induced onto utility lines by signal generators in the locate environment ("passive signals").

System embodiment 100 of FIG. 1A illustrates one example locate system. System 100 may include a utility locator 110 to receive and process magnetic field signals generated by currents impressed upon utility lines 120 and/or 130 by a locate transmitter device 140. A locate transmitter, or simply "transmitter" for brevity, is a device that generates current signals that can be either directly coupled to a utility, such as with conductive clamps or contact clips, or inductively coupled to the utility using an inductive coil antenna or other inductive device.

Currents flowing in utility lines 120 and/or 130 may also be induced from the magnetic fields generated by overhead power lines 150 and/or other passive or active signal generating elements, such as broadcast radio transmitters, etc. (not illustrated). The currents generate passive magnetic field signals that can likewise be detected and processed by locator 110.

Other system embodiments may include various additional devices. For example, additional system embodiments may include, but are not limited to, base stations, tablet computers, smart phones, other computing devices, mapping systems and devices, pipe sondes (for generating magnetic field dipole signals), and/or other pipe inspection devices. Although magnetic field signals are typically received and processed in locator 110, in some system and device embodiments, processing of signals received by locator 110 may in part or in full be implemented in a processing element of one or more devices separate from the locator, such as a laptop computer communicatively coupled to the locator, a cloud based computing system, or other local or remote processing elements.

Processing of received magnetic field signals at multiple frequencies may be used to generate an individual vector solution or gradient solution or combined vector/gradient solution for the different frequencies within the received signals set. Such a solution may include measurements at each frequency providing a magnitude, direction, and/or measurement of relative and/or absolute phase of the signal received from the buried utility and may be based on simultaneous receipt and/or processing of multiple signals at different frequencies.

Processing of the received signal may include use of principal component analysis (PCA), independent component analysis (ICA), and/or other component analysis or correlation methods. An example of such method is disclosed in co-assigned U.S. Pat. No. 7,136,765, filed Aug. 15, 2005, entitled A BURIED OBJECT LOCATING AND TRACING METHOD AND SYSTEM EMPLOYING PRINCIPAL COMPONENTS ANALYSIS FOR BLIND SIGNAL DETECTION, the content of which is incorporated by reference herein in its entirety.

Utility locator 110, as well as other utility locator device embodiments in accordance with the present disclosure, may be tuned to receive and measure signals at multiple frequencies simultaneously. For example, in an exemplary embodiment a discrete Fourier transform (DFT), or multiple parallel receiver channels, and/or other filtering techniques may be used to process and measure received magnetic field signals at multiple frequencies simultaneously. In an exemplary embodiment these frequencies may include one or more fundamental frequencies and a selection of harmonic frequencies thereof. The frequencies may be from active signals resulting from currents intentionally impressed upon a utility line and/or passive signals resulting from currents incidentally impressed upon a utility and/or other conductor(s).

For example, locator 110 of FIG. 1A may be tuned to measure a fundamental frequency/frequencies of a magnetic field signal resulting from a current signal or signals generated and coupled to the utility from the transmitter device 140, and as well as various harmonic frequencies thereof. The locator 110 may further be tuned to measure the fundamental frequency/frequencies and various harmonic frequencies of one or more passive signals emitted from the utility as a result of passively coupled currents flowing therein. Such passive signal(s) may include, for example, a 60 Hz fundamental frequency of power lines 150 as well as one or more of its harmonic frequencies (e.g., at one or more of 120 Hz, 180 Hz, 240 Hz, 300 Hz, etc.).

Some utility locator embodiments, such as locator 110 of FIG. 1A, may be phase synchronized with the power grid or with some other reference signal. For example, phase may be synchronized between the utility locator 110 and the measured 60 Hz fundamental of the nearby power lines, as well as the utility locator 110 and each harmonic frequency (the phase of harmonics of the fundamental may be shifted for various reasons, such as impedance of the utility circuit, etc.).

Figure 1B:
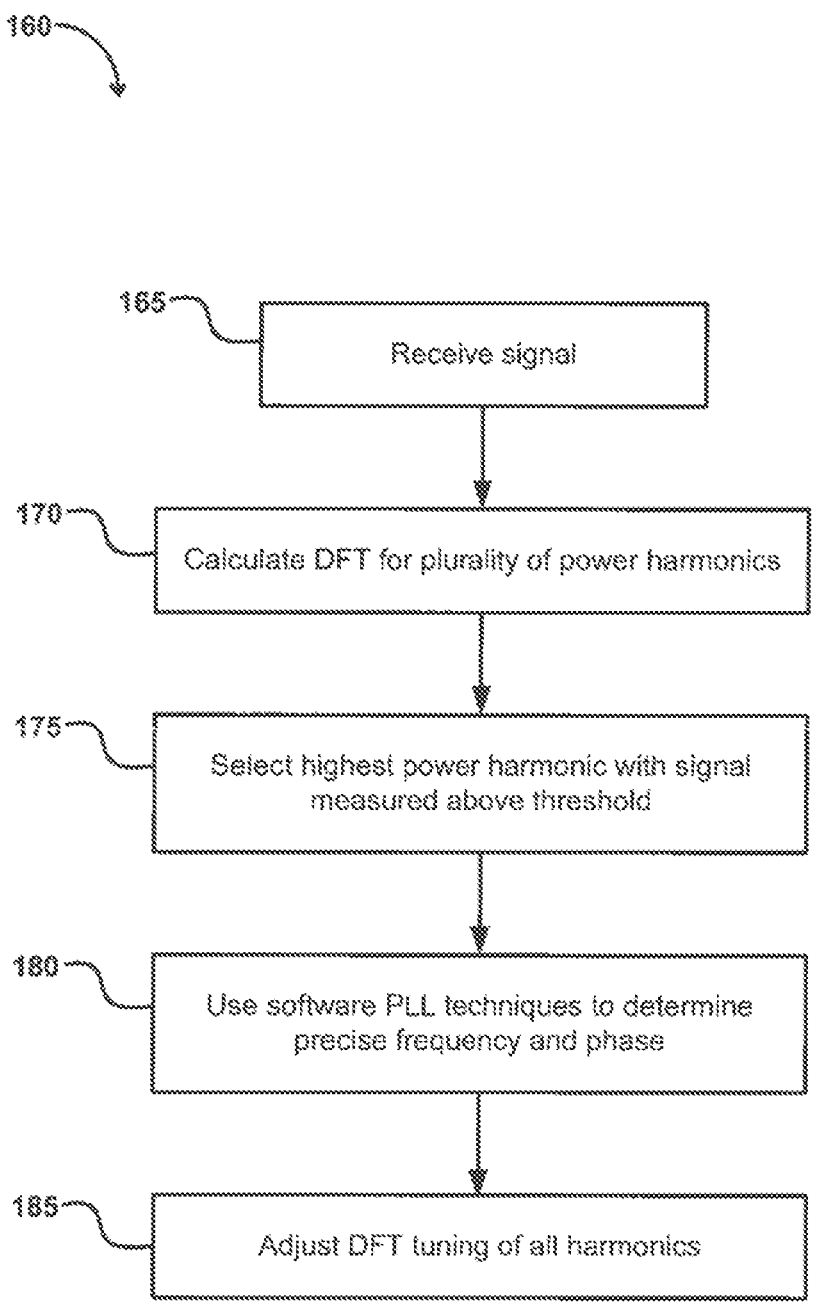
FIG. 1B illustrates details of an embodiment of a method to phase lock a utility locator to the power grid.

FIG. 1B illustrates an exemplary method embodiment 160 for phase synchronization. As illustrated in method 160, phase may be synchronized with induced signals from an AC power grid such as a 50 Hz or 60 Hz power distribution network. At step 165, magnetic field signals emitted from a utility (e.g., from a passively induced 60 Hz current) may be received at the utility locator. In step 170, a discrete Fourier transform (DFT), FFT, and/or other filtering methods may be used to determine information about harmonics of the AC power, such as amplitude and phase. In step 175, the highest harmonic with a pre-determined measured signal magnitude above a threshold may be selected (e.g., based on a hard threshold signal value or adaptive threshold value). Such a threshold may, for example, be determined by the measured relative strength of signal at that particular harmonic frequency and/or may be determined by the user, either statically or dynamically. In other embodiments, other criteria for determining such a threshold may be used, such as selecting a predefined amplitude threshold or signal-to-noise ratio threshold or other signal metric. The selected harmonic may be predetermined/preset within the utility locator, without input from a user, in some embodiments.

In step 180, a software phase-locked loop (PLL) may be used to determine a precise frequency and phase of the signal at the selected harmonic. In step 185, the DFT tuning for all harmonics may be adjusted based on the frequency and phase parameters determined in step 180. The DFT may be implemented continuously, periodically, or in some embodiments asynchronously, such as on device or user demand.

Figure 1C:
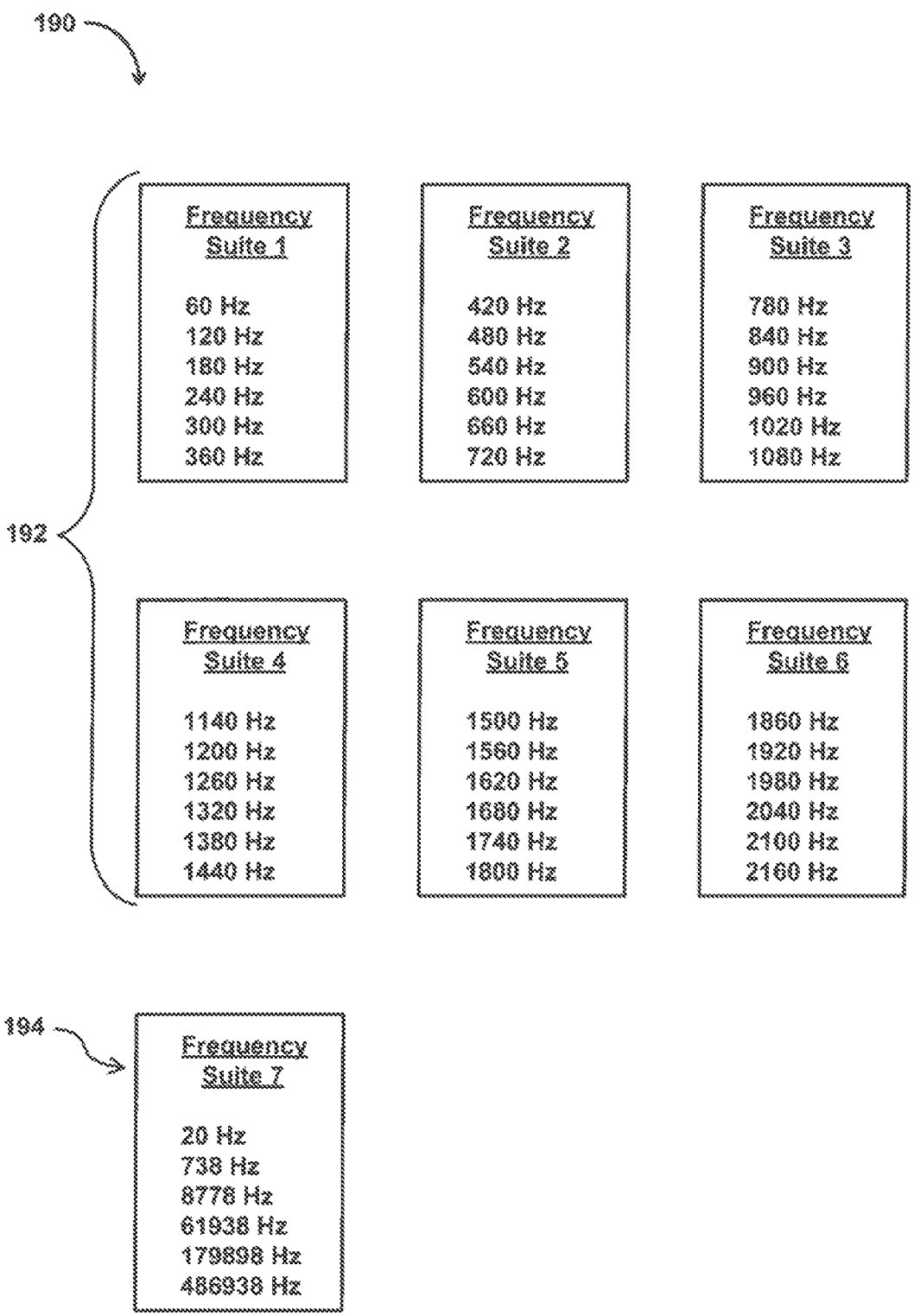
FIG. 1C illustrates example embodiments of active and passive frequency suites.

In some utility locator device embodiments, measured frequencies may be divided amongst different frequency suites, with each frequency suite including a set of two or more frequencies. For example, chart 190 of FIG. 1C shows an embodiment having seven different frequency suites, with each suite having six different frequencies. The frequency suites may include frequencies from one or more passive signals, such as the passive signal suites 192 selected based on 60 Hz power harmonics (e.g., 60 Hz signals induced in a buried conductive utility from overhead 60 Hz power lines), and/or one or more active signals, such as the active signal frequency suite 194 based on a utility transmitter coupled current signal and its associated harmonics. In some embodiments, a frequency suite may include frequencies from both passive and active signals within the same frequency suite (not illustrated in FIG. 1C). With passive frequency suites, the selected frequencies may be related (e.g., as harmonics of fundamental AC power frequencies or other environmentally induced signals) or may be a selection of unrelated or arbitrarily chosen frequencies (e.g., an AC power fundamental, a harmonic of the AC power falling in a band of particular interest (e.g., the $10^{th}$ or $15^{th}$ harmonic), an induced broadcast radio frequency, other unrelated induced signal frequencies, etc.). For passive suites in particular, the suite may be simply a list of frequencies that may contain one or more signal components of interest that are not intentionally induced (e.g., through use of a transmitter or other induction device as an "active" signal). Passive frequency suites that include a set of frequencies that are not related may also be denoted herein as a "passive frequency group." Passive frequency groups are just lists of two or more passive frequencies where magnetic field signals may be present, with the magnetic field signals resulting from currents flowing in the utility as a result of environmental conditions and not active coupling by a user.

In a typical operation, the frequency component signals of an active suite are all coupled (initially) to a particular utility or utilities at a single point, whereas the passive signals can come from anywhere in the environment. Active signals can cross-coupled to other utilities or other conductors in the environment once they are coupled initially, and this coupling is typically a function of frequency, which results in different measurement information at the locator as the user's position changes due to phase and amplitude changes to the coupled signals due to the particular locate environment structure and parameters (e.g., utilities or other conductors present and cross-coupling therebetween, soil conditions and impedance/conductivity, above-ground structures, etc.).

In various embodiments, targeted frequencies may be distributed amongst one or more frequency suites. For example, FIG. 1B illustrates six passive frequency suites 192 and one active frequency suite 194. The frequencies within the six passive frequency suites 192 include the 60 Hz fundamental power line frequency and harmonics thereof distributed throughout frequency suites 1 through 6 (assuming that 60 Hz power signals are induced from a power line or other AC power source in the proximity of the locate site). Frequency suite 7 includes signal frequencies that result from currents that are actively generated in a transmitter and coupled directly or inductively to the utility.

In other embodiments, various frequency suites may contain both fundamental and/or harmonic frequencies from various passive and/or active signals, either separated or combined. Utility locator device embodiments may, for example, have thirty two separate frequency suites each containing six frequencies. In other embodiments, any number of frequencies may be contained within each frequency suite, and the frequencies which may also be distributed in various ways amongst any number of frequency suites and/or be selectable/customizable by the user, such as through a user interface on the locator or via a pre-locate setup interface on or coupled to the locator to allow a user to set the locator up for operation at a particular locate site.

Utility locators disclosed herein, such as locator 110 of FIG. 1A, may also include mapping and/or location tracking sensors and systems such as global navigation satellite systems (GNSS, GPS), inertial navigation systems (INS), optical navigation systems/sensors and/or motion tracking sensors. Examples of utility locator embodiments with such sensors/systems are disclosed in various incorporated applications.

Figure 2:
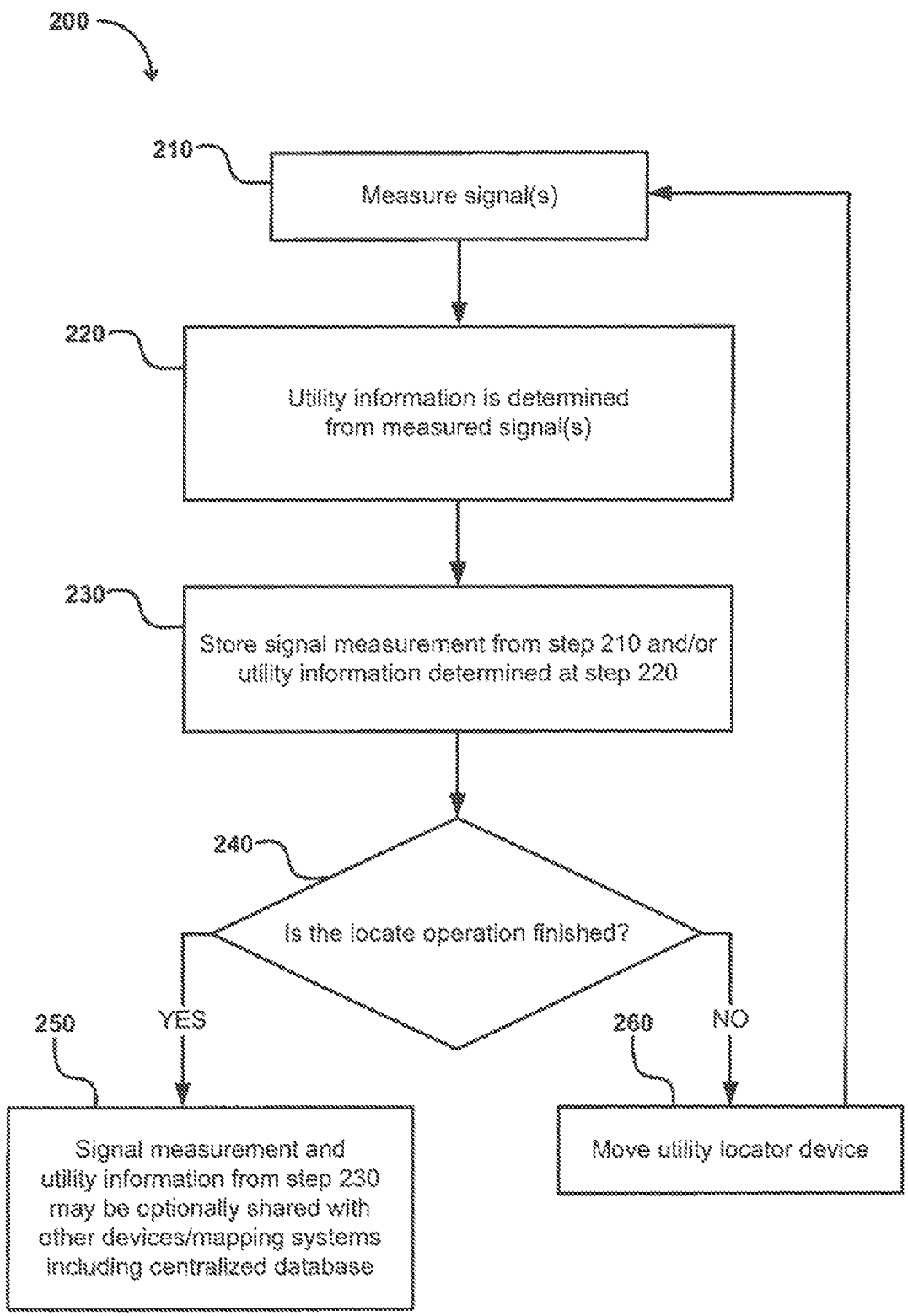
FIG. 2 illustrates details of an embodiment of a method for combined passive and active locating method.

FIG. 2 illustrates a method embodiment 200 using a utility locator including a position sensing module for determining and storing its location (e.g., a GPS receiver, inertial sensor, etc.). In step 210, the utility locator may simultaneously receive and measure signals at each fundamental and a selection of harmonic frequencies thereof based on one or more frequency suites. Such measurements may include a vector, gradient, and or combined vector/gradient solution at each frequency, containing a magnitude and direction as well as an absolute and/or relative phase measurement, which may further be associated with the utility locator's determined geographical location (e.g., through use of a GPS receiver or other positional determination module) and stored in a non-transitory memory.

In step 220, the individual signal measurements may be used to determine location, depth, and/or utility type corresponding to the locator's location based on the device's mapping and/or location tracking sensors and systems. Various method embodiments for determining utility information are described subsequently herein in conjunction with FIGS. 11-17. In step 230, the measured signal data from step 210 and/or determined utility information from step 220 may be stored in a non-transitory memory in the locator device.

A decision may be made in step 240 as to whether the utility locate operation is completed (i.e., the user is finished doing a locate operation in the area). If the locate operation is finished, the measured signal data and/or determined utility locate information stored at step 230 may optionally be communicated to other system devices, such as mapping systems and/or other local or remote systems or centralized database(s), at step 250. In some embodiments, such information may continually and/or periodically be communicated to other systems/devices throughout the utility locating process, such as through WiFi connections, cellular data connections, or other wired or wireless communication connections and associated modules in the locator and remote system. Alternately, or in addition, the information may be collected and stored onsite in the locator or an associated device, such as a tablet, cellular phone, laptop computer, and the like, for later processing.

Returning to step 240, if the utility locate operation has not been completed, in step 260 the utility locator may then be moved (e.g., by having the user walk further around the locate area/continue locating operation). Method 200 may then be repeated at step 210. In some method embodiments, successive iterations may utilize prior signal measurement and/or determined utility information to refine future locating data.

Figure 3:
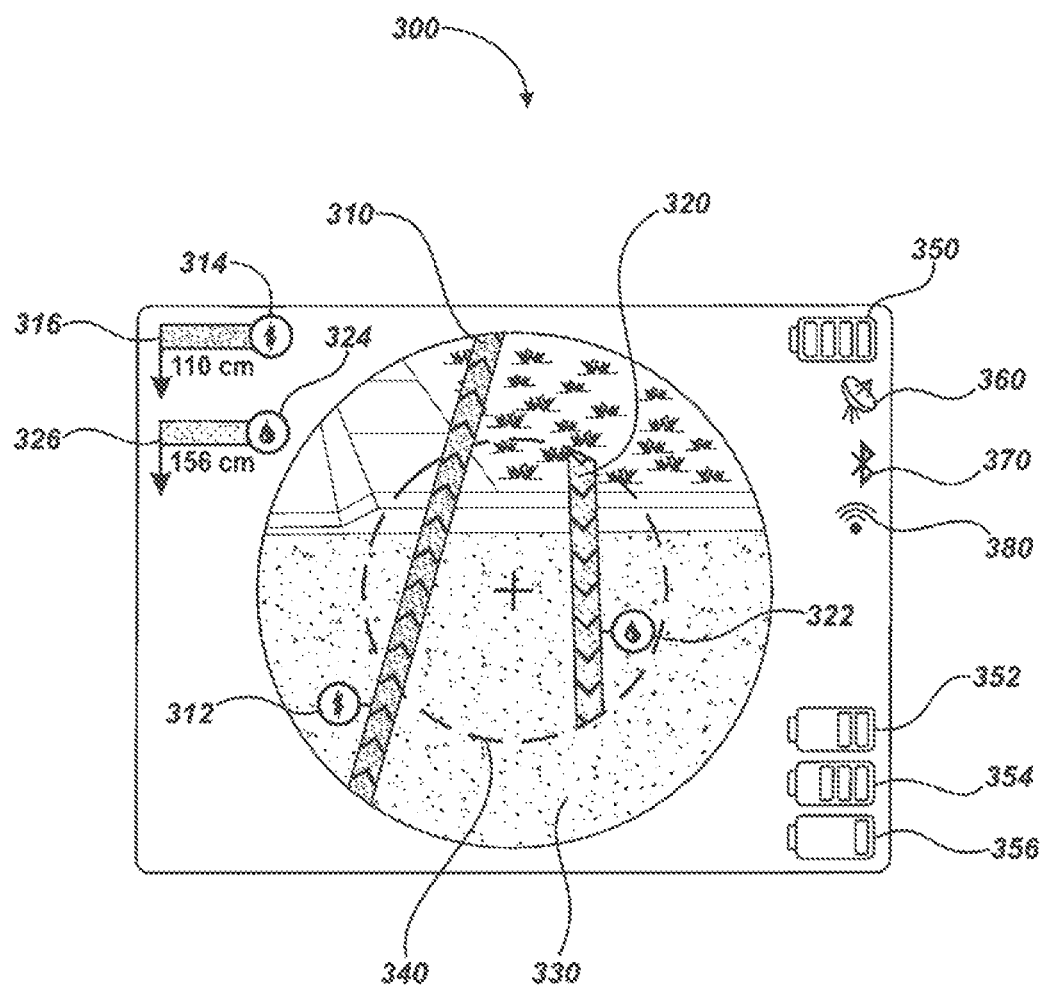
FIG. 3 illustrates details of an embodiment of a graphical user interface for a utility locator device.

FIG. 3 illustrates details of a locator graphical user interface (GUI) display embodiment 300 in accordance with aspects of the present disclosure. The GUI may be used for providing locate-related information to the user during the locate operation as well as for receiving input from a user to control locator operation. The display 300 may show the determined location of utility lines, such as through displayed lines 310 and 320 as oriented on a map 330 or other representation of the locate area. In an exemplary embodiment, the representation of utility lines 310 and 320 may be based on signal data determined simultaneously at multiple frequencies from multiple signal components within one or more frequency suites.

As is known in the art, locate information, such as position of the utility, depth of the utility, and orientation of the utility relative to the locator (in two or three-dimensional space) is typically determined in existing locators based only on measurements of magnetic field signals at a single frequency at a given time. However, separate determinations of locate parameters may be made simultaneously on two or more frequencies in a suite of frequencies by separating out the various component frequency signals by, for example, use of a DFT or other frequency-selective filter, and performing locate calculations simultaneously on each of the signal frequency components.

The individual frequency component results may be aggregated in various ways to provide a composite output or multiple discrete outputs. For example, the determined locate data (e.g., position, depth, current magnitude, orientation, phase angle, etc.) may be averaged or otherwise combined (e.g., by thresholding, weighted averaging, or other techniques as known or developed in the art for combining multiple samples into one or more results) based on separate determinations from two or more frequencies in a suite, or from frequencies in different suites, or from combinations thereof. Separate suites of active and passive frequency signals and correspondingly determined data may be associated, combined, displayed, and/or stored in a non-transitory memory of the locator or other associated device.

For example, in one embodiment, information from signals received and processed from signals in frequencies in multiple frequency suites may be rendered as a single displayed line on display 300. This may be done separately for each utility line present, such as for separate utility lines 310 and 320. As shown in FIG. 3, lines 310 or 320 may be rendered on the display to represent two separate utilities beneath the ground as determined by the utility locator, with each of the lines presented based on data from utility data calculations (e.g., position, depth, current magnitude, orientation, phase angle, etc.) make from two or more different frequency signal components. In one embodiment, one or more of the signal components may be from an active frequency signal component, while one or more others may be from a passive frequency signal component. In some embodiments both types of signal components may be present on one or more of the targeted utilities, such as for utilities where passive signals have been induced thereon (e.g., by nearby AC power lines) as well as active signals that are directly or inductively coupled from a utility locator transmitter. By measuring multiple signal components at separated frequencies, better locate information may be obtained than from use of a single frequency magnetic field signal as it used in traditional locators.

Lines 310 and 320 of FIG. 3 may be superimposed onto a map 330, which may be generated from map data or imagery stored or collected in the utility locator and/or other map system or other representation of the locate area. For example, map data may be stored in the locator such as is done in common devices like automotive GPSs and the like, and/or map data may be downloaded from a remote site to the locator via a wired or wireless connection, or may be loaded from a memory device such as USB thumb drive or memory card. Map data may be in either vector or raster format, and may include graphics, line drawings, photographic images, video, or other image or graphics types.

Each utility line may be visually distinguished from each other on the display. For example, lines 310 and 320 may be distinguished by different patterns and/or colors on the display 300 and/or by shading, dashing or different line types, and the like. Different indicators of utility type, such as utility type indicators 312, 314, 322, and/or 324 may be used to present a particularly determined utility type visually to the user. Utility type may be determined by, for example, selecting a particular active frequency or frequency suite to be applied to the particular type of utility from a coupled utility transmitter or by other utility type identification methods such as those described in the incorporated applications. Individual frequencies and/or information on frequency suites used in determining the utility lines may also be provided on the locator display, such as through a visual list, color code, or other representation on the display. Likewise, the determined utility data may be associated with and stored with particular frequency or frequency suite information used to determine the data.

A visual metric or icon representing utility depth, such as depth gauges 316 and 326, may be displayed, corresponding to a determined depth of each line 310 and 320 (based on data generated by processing magnetic field signals of multiple frequency components in one or more frequency suites or groups). Additional visual indications of the relative depth of the utility or utilities may also be included. For example, line width variations, such as a shortening of line 320 within concentric circle 340, may be used to determine its depth relative to line 310 and/or depth relative to the ground's surface. Various other display and indication methods, such as those described in the various incorporated applications or otherwise known or developed in the art, may also be used in various embodiments.

Display 300 may include additional gauges and/or indicators. For example, a battery gauge 350 may be included to indicate available power left for the utility locator's battery. Examples of batteries and associated devices and gauging as may be used in such a locator are described in the incorporated applications. If other locate system devices are used during a locate operation, additional battery gauges 352, 354, and 356 may be provided on the display to show the battery power of other communicatively coupled system devices (e.g., utility locate transmitters, paint marking devices, video camera systems and camera control units, and the like). Additional indicators, such a Global Navigation Satellite System (GNSS) connectivity indicator 360, Bluetooth connectivity indicator 370, and wireless local area network (WLAN) connectivity indicator 380 may be provided on the display to indicate status of such sensors/systems within and/or connected to the utility locator.

In other embodiments, additional information may be conveyed by a graphical interface such as the display 300 of FIG. 3, such as the various display information illustrated in the incorporated applications. A utility locator may further provide information in other ways besides graphical interface including, but not limited to, textual information, visible light indicators, audible indicators, haptic feedback indicators, and/or other user interface or data presentation devices as known or developed in the art.

Figure 4:
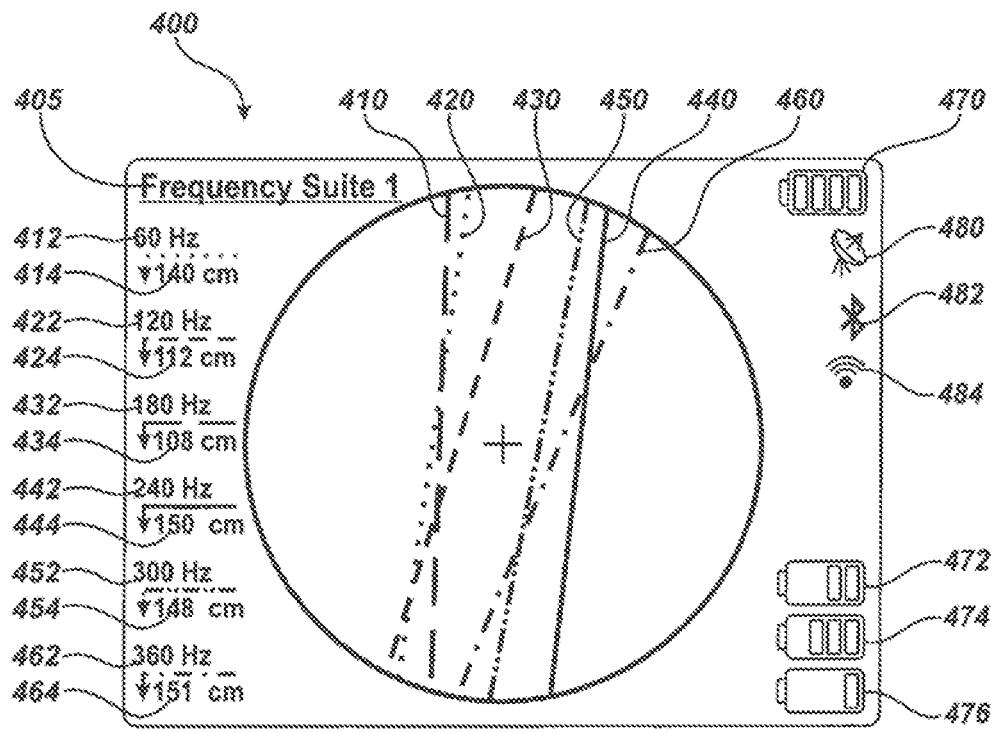
FIG. 4 illustrates details of an embodiment of a graphical interface showing locate information determined based on a first frequency suite.

In some utility locator embodiments, a locator display may be provided to allow a user to toggle between various screens to show different sets of information. For example, one such screen may display frequencies used within each individual frequency suite or may show frequencies from multiple frequency suites. One example of this is illustrated in FIG. 4, where display 400 shows a passive signal frequency suite 1, represented as element 405, comprises elements at 410, 420, 430, 440, 450, and 460 (representing utility information determined from magnetic field signal components at frequencies 60 Hz, 120 Hz, 180 Hz, 240 Hz, 300 Hz, 360 Hz). In this case the frequencies 410, 420, 430, 440, 450, and 460 of passive suite 1 include a fundamental 60 Hz power line frequency as well as various harmonics of the fundamental.

Figure 5:
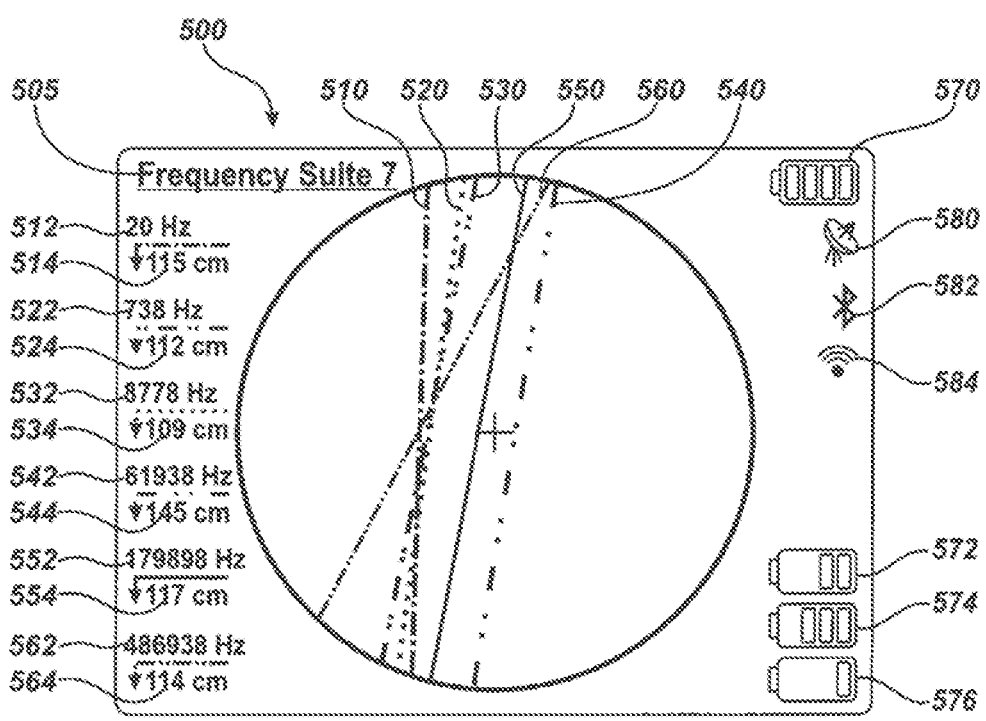
FIG. 5 illustrates details of an embodiment of a graphical interface showing locate information determined based on a second frequency suite.

FIG. 5 illustrates an active frequency suite. On display 500 of FIG. 5, active component signal frequency suite 7, shown as element 505, comprises elements 510, 520, 530, 540, 550, and 560 (representing utility information determined from magnetic field signal components at 20 Hz, 738 Hz, 8778 Hz, 61938 Hz, 179,898 Hz, 486,938 Hz). The frequencies 510, 520, 530, 540, 550, and 560 of active suite 7 are active frequencies intentionally coupled to the utility line by a transmitter device and/or other transmitting element, such as a magnetic field induction stick. As described previously herein, locate data (e.g., depth, position, phase, current magnitude, direction, etc.) may be simultaneously determined from each of multiple frequencies within a suite and/or from multiple frequencies across suites for display and/or storage in the locator and/or on a remote computing system. This data may be presented in various combinations on the display and/or may be stored in a non-transitory memory, or may be presented discretely and/or stored discretely in a non-transitory memory, and/or may be transmitted, via a wired or wireless communications module (e.g., WiFi, cellular data, Bluetooth, etc.) in the locator, to a local (e.g., notebook computer, tablet, cell phone, etc.) or remote electronic computing device or system (e.g., a back-end server system).

For example, data from frequency 410, 420, 430, 440, 450, and 460 of FIGS. 4 and 510, 520, 530, 540, 550, and 560 of FIG. 5 may correspond to a frequency indicator and depth gauge on their respective displays 400/500 as shown. As such, each of the depth indications, as well as each of the lines shown on the displays in FIG. 4 and FIG. 5, represents a separate simultaneously determined depth and position estimate of a utility based on signals from the corresponding signal frequency components. Further, each frequency 410, 420, 430, 440, 450, and 460 of FIG. 4 may correspond to a frequency indicator 412, 422, 432, 442, 452, and 462 and depth gauge 414, 424, 434, 444, 454, and 464 as shown. Likewise, each frequency 510, 520, 530, 540, 550, and 560 of FIG. 5 may correspond to a frequency indicator 512, 522, 532, 542, 552, and 562 and depth gauge 514, 524, 534, 544, 554, and 564 as shown.

Displays 400 of FIG. 4 and 500 of FIG. 5 may also include other gauges and/or indicators. For example, battery gauge 470 of FIG. 4, which may correspond to battery gauge 570 of FIG. 5, may be provided to indicate available power left in the utility locator's battery. An array of battery gauges 472, 474, and 476 of FIGS. 4 and 572, 574, and 576 of FIG. 5 may further indicate battery power of other communicatively coupled locate system devices. Additional indicators, such a Global Navigation Satellite System (GNSS) connectivity indicator 480 of FIG. 4 or 580 of FIG. 5, Bluetooth connectivity indicator 482 of FIG. 4 or 582 of FIG. 5, and wireless local area network (WLAN) connectivity indicator 484 of FIG. 4 or 584 of FIG. 5, may be provided on the display from communicatively coupled devices to indicate status of such sensors/systems within or connected to the utility locator. The information, gauges, and indicators of display 400 of FIG. 4 may, in some embodiments, correspond to the same information, gauges, and indicators present in display 500 of FIG. 5.

Figure 6:
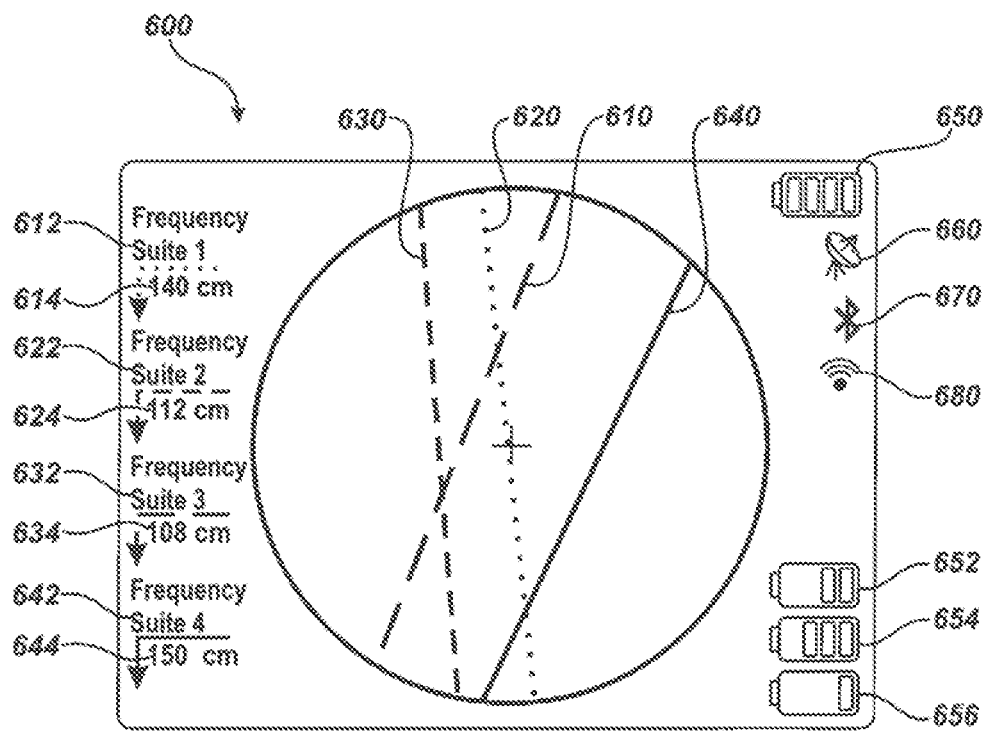
FIG. 6 illustrates details of an embodiment of a graphical interface showing display of locate information.

In other embodiments, data from multiple frequency suites may be displayed simultaneously, either from single frequency components in each suite or from combinations, averages, and the like from each suite. For example, as illustrated in FIG. 6, display 600 may include four separate linear elements (lines) 610, 620, 630, and 640 of various line types/dashes. Each line 610, 620, 630, and 640 may be representative of data determined from component frequency signals in a separate frequency suite. For example, data generated from component signals in frequency suite 1, shown as element 612, may correspond to line 610, data generated from component signals in frequency suite 2, shown as element 622, may correspond to line 620, data generated from component signals in frequency suite 3, shown as element 632, may correspond to line 630, and data generated from component signals in frequency suite 4, shown as element 642, may correspond to line 640.

A depth gauge 614, 624, 634, and 644 may be included corresponding to data generated from one of each frequency suite 612, 622, 632, and 642 as shown in FIG. 6. Data from each frequency suite may be shown individually or in combination. For example, combination data may be shown by averaging of signal data within each frequency suit and/or other filtering or combining methods, such as, for example, thresholding, weighted averaging, and/or other methods may be used to determine a single representative line for each suite, such as lines 610, 620, 630, and 640, and/or singular result for each suite for depth measurement, such as the depth measurements found with depth gauges 614, 624, 634, and 644 and/or other singular representations of data within each frequency suit.

Display 600 may further include a locator battery gauge 650 as well as connected device battery gauges 652, 654, and 656 similarly to those shown in FIG. 4 and FIG. 5. Display 600 may include other information from communicatively coupled locate system component, such as a Global Navigation Satellite System (GNSS) connectivity indicator 660, Bluetooth connectivity indicator 670, and a wireless local area network (WLAN) connectivity indicator 680.

Figure 7:
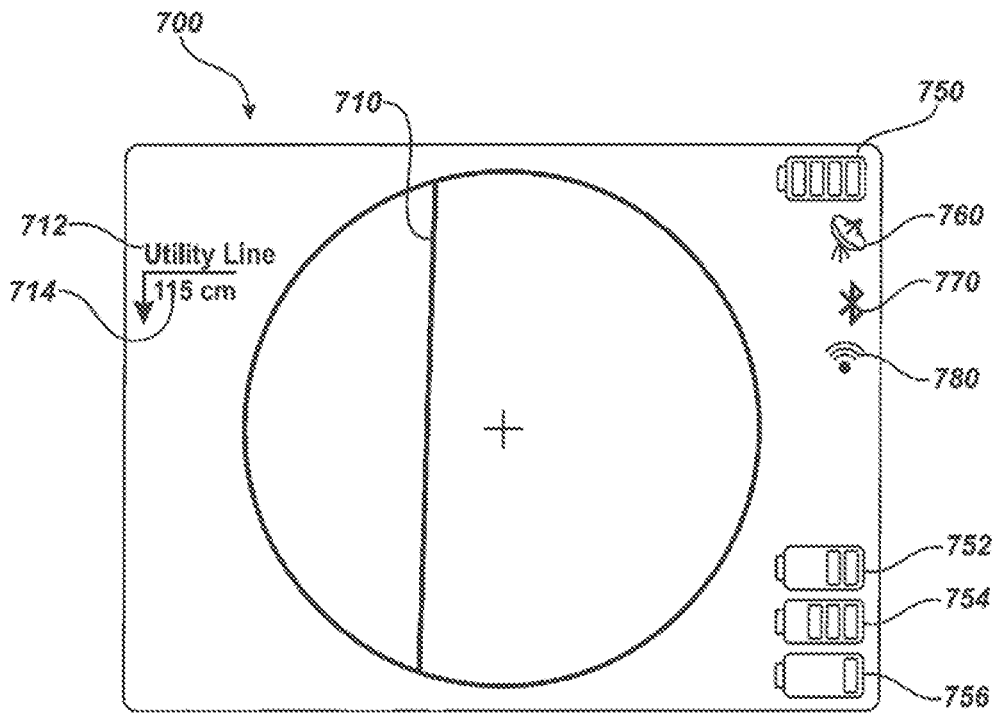
FIG. 7 illustrates details of an embodiment of a graphical interface showing locate information of a utility with a single line.

In other embodiments, all or some frequency suites may be factored to display a single linear element (line) per buried utility line as determined by the utility locator. For example, as illustrated in FIG. 7, display 700 includes a single line 710 representative of a buried utility. Line 710 may be used to determine location of utility line 712 as determined through processing signal components from all or a subset of frequency suites used in the locator. A depth measurement 714 may likewise be included to indicate determined depth of utility line 712 from the generated data. Display 700 may include other indicators from communicatively coupled locate system devices such as a locator battery gauge 750 and/or an array of connected device battery gauges 752, 754, and 756. Display 700 may further include a Global Navigation Satellite System (GNSS) connectivity indicator 760, Bluetooth connectivity indicator 770, and a wireless local area network (WLAN) connectivity indicator 780.

The devices, systems, and methods of the present invention may determine various locate information associated with the utility or utilities present in the locate area. For example, devices, systems, and methods in accordance with the disclosures herein may be configured to determine the type of utility present as well as its location and/or depth within the ground from a "spectral signature" determined by the utility locator. The term "spectral signature" as used herein refers to a set of measurements of magnetic field signals taken at separate signal frequency components of the frequency suites simultaneously. One example of such a spectral signature is a power spectral density measurement of a passive AC power fundamental and one or more of its harmonics. Other combinations of signal components, either related (e.g., as harmonics) or unrelated (e.g., with discrete active frequency signal components coupled to a utility from a transmitter) may be measured simultaneously to determine a spectral signature. The spectral signature may be determined by receiving and processing a wideband magnetic field signal across a bandwidth that extends over two or more frequencies (preferably all frequencies) of a frequency suite. The wideband signal may be processed, such as by using a DFT or other filtering method, to simultaneously extract discrete frequency signals from the separate frequency signal components of the frequency suites or groups. The frequency components measured may include one or more fundamental frequencies and one or more of their harmonic frequencies. These may be received from passive and/or active sources (while several examples of passive source AC power signals are described with respect to their fundamental frequency and harmonics, active signals may also have one or more harmonics of a fundamental frequency that can be included in an active frequency suite). The measurements may be a vector, gradient, and/or combined vector/gradient solution with magnitude, direction, and phase measurements for each frequency component of the respective frequency suites. Such a "spectral signature" may also include measurements of phase and/or other component signal information.

Figure 8:
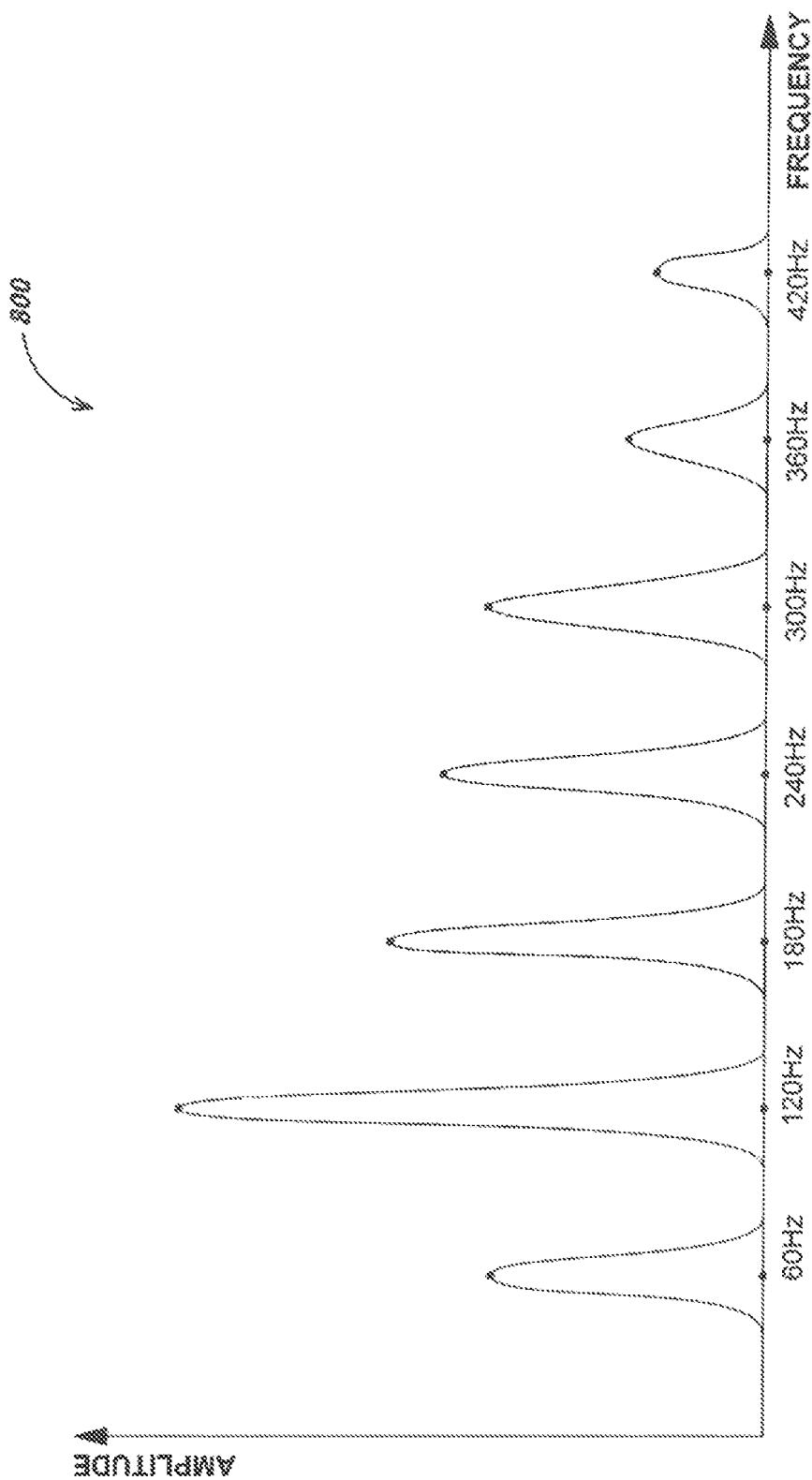
FIG. 8 illustrates an example graph showing one spectral signature of measured frequencies of a frequency suite or suites.
Figure 9:
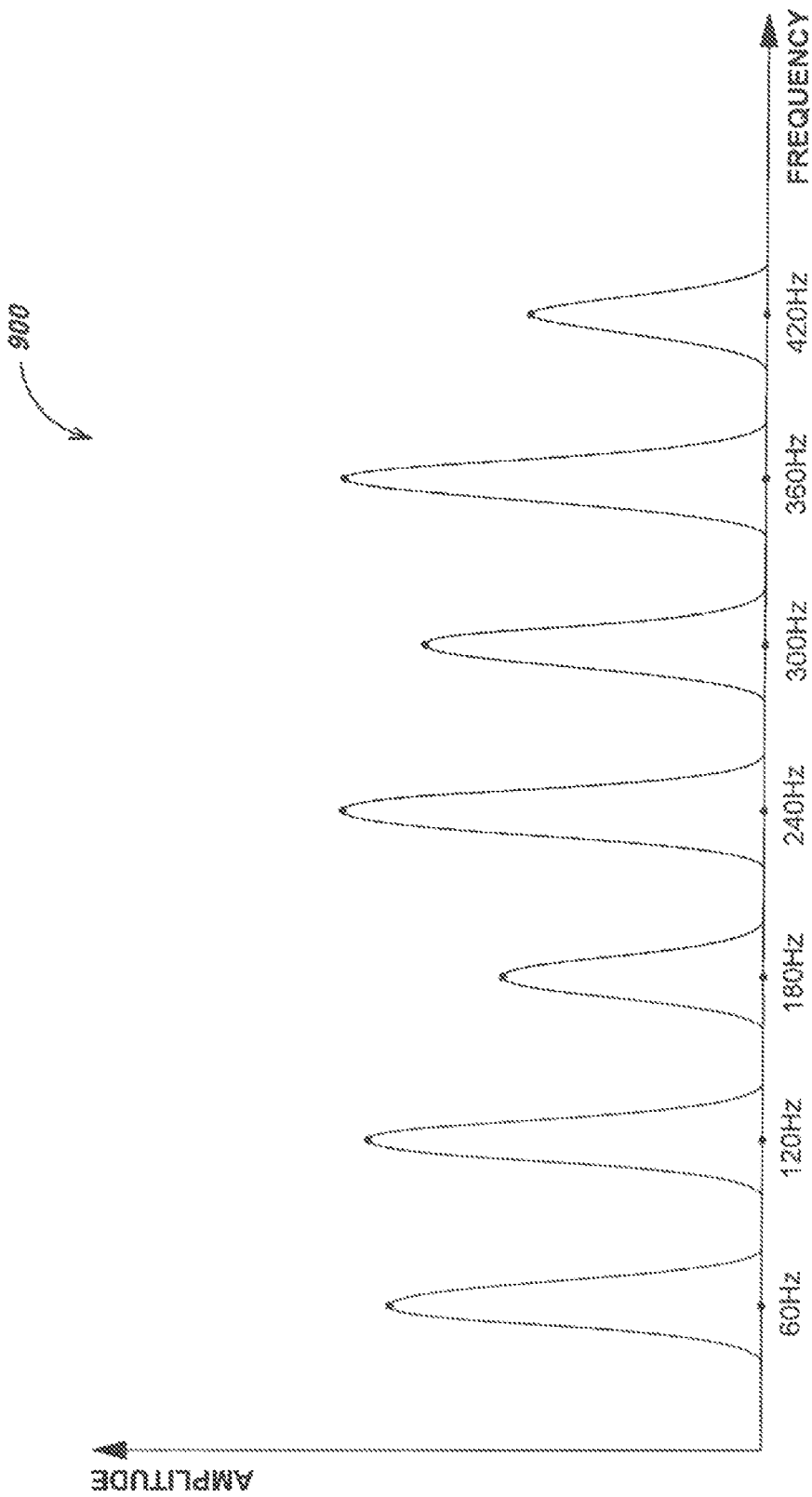
FIG. 9 illustrates an example graph showing another spectral signature of measured frequencies of a frequency suite or suites.
Figure 10:
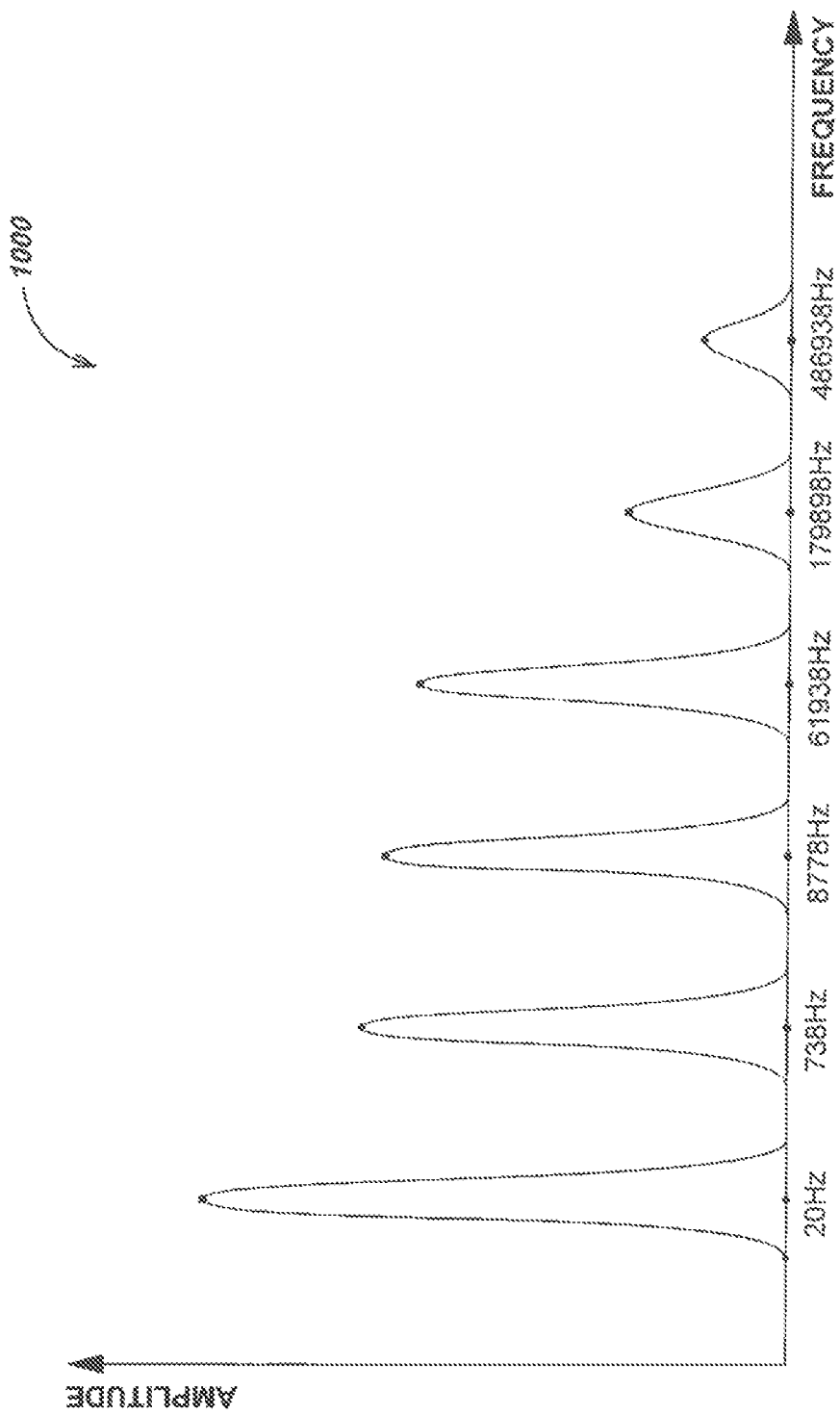
FIG. 10 illustrates details of an example spectral signature of measured frequencies from an active signal.

As illustrated in graph 800 of FIG. 8, graph 900 of FIG. 9, and graph 1000 of FIG. 10, signal components as measurements at various frequencies may be used to determine various types of information about the utility based on its spectral signature. For example, power lines, water lines, sewer lines, cable TV, and so on may all produce a characteristic spectral signature. As one example, a pipeline with a thin paint coating may cause bleed off of the high harmonic frequencies, similar to the example shown in graph 800 of FIG. 8. As another example, an electric power line may have a series of spikes spaced at odd harmonics frequencies similar to graph 900 of FIG. 9. The spectral signature for single phase AC power lines may be distinct from three phase power lines due to different harmonic interactions (for example, certain harmonics may cancel each other out in multi-phase power distribution lines and/or may be additive depending on the power line configuration, loading, etc.). Various other utility types may be determined by spectral surveys of various test environments to identify particular spectral signatures of the various underground test environment configurations or made be determined by survey measurement in well-document underground environments.

Active signals, such as those illustrated in the example graph 1000 of FIG. 10 may also generate a specific spectral signature, either due to the characteristics of the utility or intentionally through construction of a particular harmonic spectra of the signal coupled from the transmitter to the utility.

In addition to, or in place of amplitude characteristics, a spectral signature, such as those shown in FIGS. 8-10, may include phase measurements and changes in relative phase (between the harmonics at different positions along the utility). The relative signal amplitude and direction in the measurement as the utility locator is moved about the locate area by a user may also change due to the environment at the locate site.

For example, measured phase characteristic within the spectral signature may be used to identify a vertical, horizontal, and/or twisting pattern of a three phase AC electrical power line as a utility locator is moved about the locate area. The measured data may also provide additional utility information such as, but not limited to, the type of utility detected.

Both graph 800 of FIG. 8 and graph 900 of FIG. 9 illustrate a 60 Hz fundamental AC power frequency and the first six harmonics thereof. In various embodiments, the devices, systems, and methods herein may receive and process signals at multiple fundamental frequencies and multiple harmonic frequencies thereof as measurements of absolute and/or relative phase and/or other signal information from either active or passive signals or a combination of both active and passive signals.

As noted above, utility locators in accordance with the present disclosure and systems and methods thereof may use the spectral signature to determine buried utility information using various processing and analysis techniques. For example, step 220 of FIG. 2, in which utility information may be determined, may be implemented in various ways.

Figure 11:
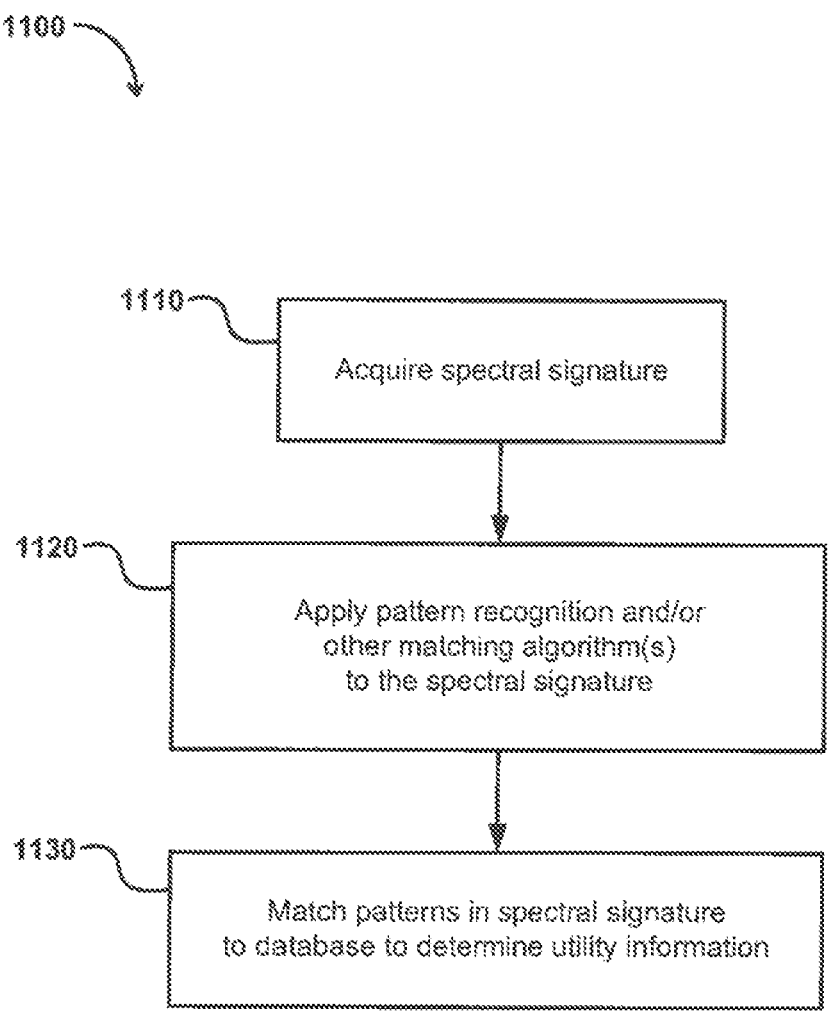
FIG. 11 illustrates details of an embodiment of a method for determining utility information based on a spectral signature.

In one method embodiment 1100 of such a step, as illustrated in FIG. 11, step 1110 may include acquiring a spectral signature from two or more signals at different frequencies. In step 1120, pattern recognition and/or other matching algorithms and/or methods may be applied to the spectral signature to correlate or otherwise match the received spectral signature with a reference spectral signature associated with a particular utility and/or environmental configuration. For example, certain types of utility lines may have higher energy on certain harmonic frequencies and lower energy on other frequencies. The received spectral signature may be compared to reference spectral signatures to determine a degree of match thereto, and when a match within a predefined tolerance is met the received spectral signature may be determined to be the particular reference signature utility type. In addition to magnitude spectral signatures, patterns may be determined and compared to references based on direction and/or magnitude of vectors, vertical gradients, and/or other gradient patterns at each frequency. These patterns within the spectral signature may be determined, upon sufficient match, to be indicative of a type of utility or utilities present as well as other utility and/or environmental information. For example, cluster analysis (see, e.g., https://www-users.cs.umn.edu/~kumar/dmbook/ch8.pdf, https://en.wikipedia.org/wiki/Cluster_analysis which are incorporated by reference herein) or other signal processing techniques may be used to determine the presence of multiple utility lines clustered together as determined through the spectral signature. In addition, as a utility locator is moved about a locate area, the amplitude and/or vector and/or gradient of each different frequency component may change based on location and particular active and/or passive signal(s) impressed upon the utility or utilities. The distance from the signal source(s), conductivity of ground material, and various other factors may also change the measured spectral signature at each geographic location within the locate operation. Once a locate area is mapped, the determined spectral information may be stored as a reference and used for comparison in subsequent locate operations in the same area or other areas with new spectral signatures.

Pattern recognition and/or other matching algorithms and/or methods of step 1120 may use artificial intelligence, machine learning, and/or other techniques that are known or developed in the art to determine such change/variation and/or other previously unknown patterns in spectral signature and may be used to make determinations about utility information based on information stored within a locate database of historic and/or other spectral signature data. Such a database may include one or more centralized databases which may be stored in the cloud and may be cloud storage accessible by other utility locator devices and/or other computing devices used for locate operations or back end locate data analysis. In step 1130, utility information may be determined by matching patterns in the received spectral signature to database information contained within the utility locator or remotely stored and accessed. Such a database may be rewriteable and dynamically adjusted based on acquired signal data. Processing may occur in real time and/or be post processed either within the utility locator and/or on another external computing system.

Figure 12:
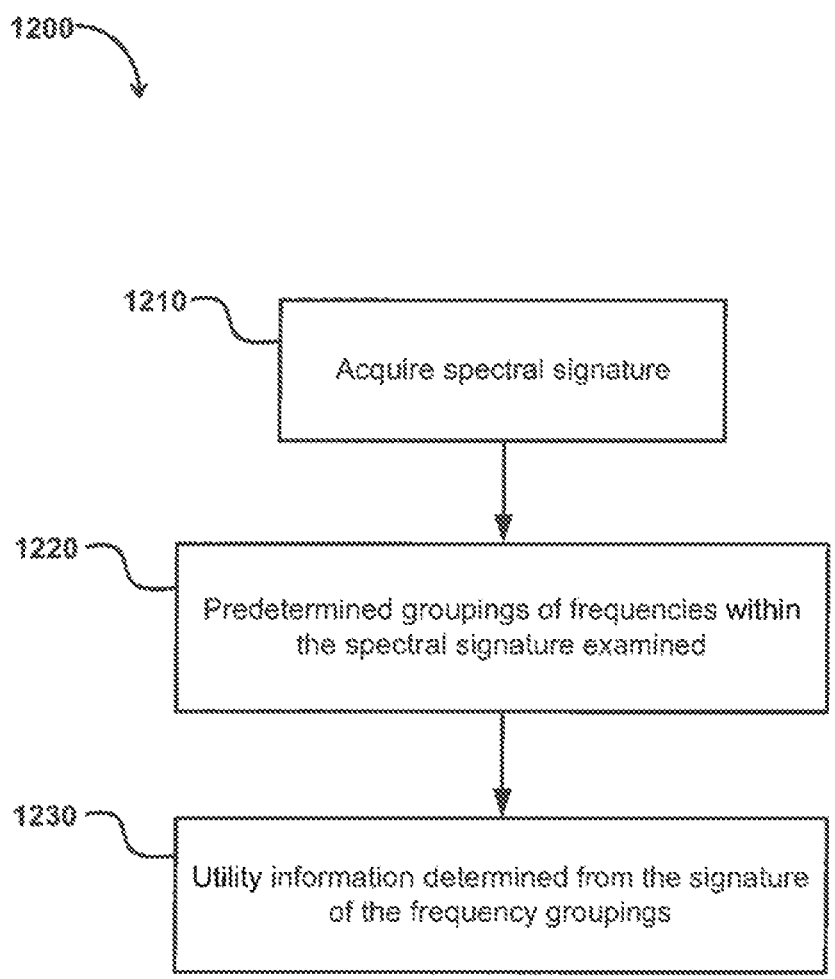
FIG. 12 illustrates details of another embodiment of a method for determining utility information based on a spectral signature.

FIG. 12 illustrates a method embodiment 1200 for processing spectral signatures. Step 1210 may include acquiring a spectral signature from two or more signal components at different frequencies. In step 1220, even and odd harmonic frequency components within the spectral signature may be separated and/or may be processed and analyzed separately. In step 1230, ratios of odd and/or even harmonics may be used as a metric to determine utility type and/or other utility information based on comparisons to reference ratio data.

For example, as a utility locator is moved about the locate area, the amplitude and/or vector and/or gradient of each separate frequency signal component may change based on the location of the measurement (due, for example, to changes in the underground environment around the utility, such as interaction with other conductors in the area, distance below ground surface, ground conductivity, and the like).

Although changes at each frequency may occur in some positions, if the received signal at those frequencies is largely from the same utility line and/or other conductor, ratios of various frequencies to each other may remain approximately the same as the utility locator is moved about even as their amplitudes change (e.g., such as when the general underground environment is homogeneous throughout the locate area). For example, as a user walks about the locate area equipped with a utility locator the amplitude of the 120 Hz and 240 Hz harmonics may increase or decrease proportionately to each other (e.g., when other utilities are absent from the area so that they do not create interactions, or when the utility is a straight, not interrupted conductor without branching). The proportionate change in amplitude may be used to determine that the measured signal is from the same utility within the ground and is just being located at different positions in the locate area (as opposed to it being a different utility that has the measured signal components coupled to it).

Figure 13:
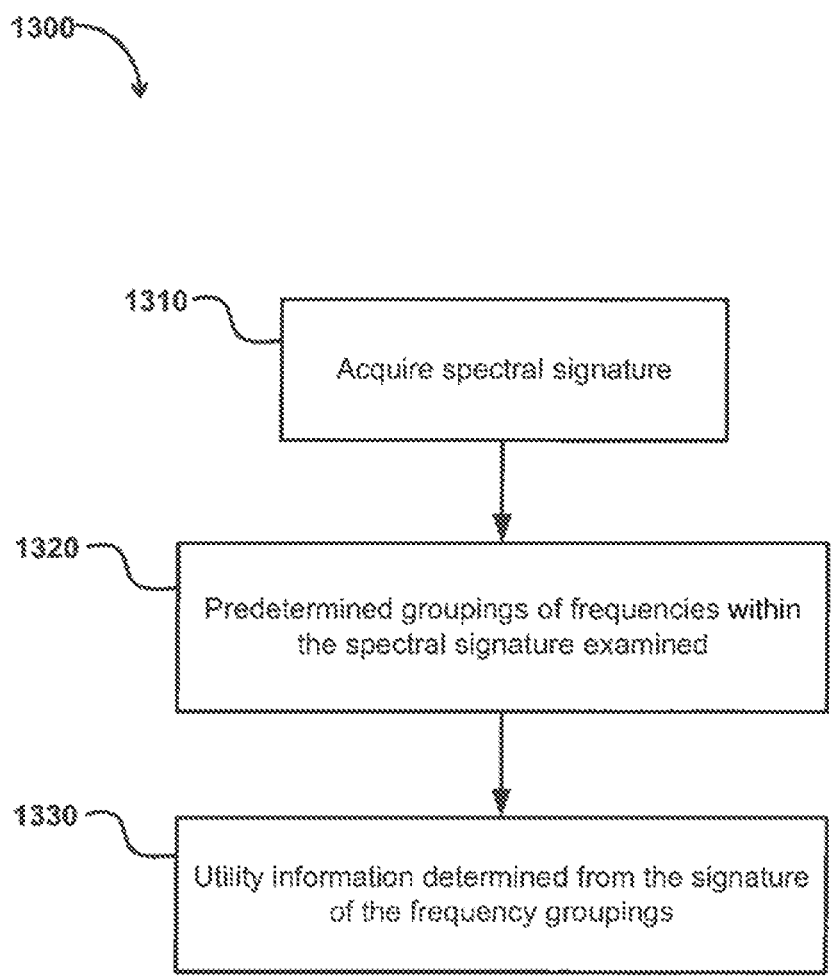
FIG. 13 illustrates details of another embodiment of a method for determining utility information based on a spectral signature.

FIG. 13 illustrates a method embodiment 1300 for using spectral signatures to identify utilities. Step 1310 may include acquiring a spectral signature from two or measured signal components at different frequencies. In step 1320, predetermined groupings of frequencies within the spectral signature may be processed and analyzed separately from other frequencies. For example, certain utility types may have characteristically high and/or low energy at certain harmonic frequencies. This may be predetermined by testing utility configurations in test sites or based on data collected at well-known underground environments. In step 1330, utility information may be determined from the signature of the frequency groupings based on comparison to reference data. For example, a spectral signature where the majority of the energy is distributed onto even harmonic frequencies may indicate a gas line with cathodic protection, whereas a spectral signature where the majority of the energy falls onto odd harmonics may indicate an electric line. Such a method may also include determination of a grouping of frequencies that may be used to identify the utility based on particular characteristics of known utility types and/or configurations at those frequencies.

Figure 14:
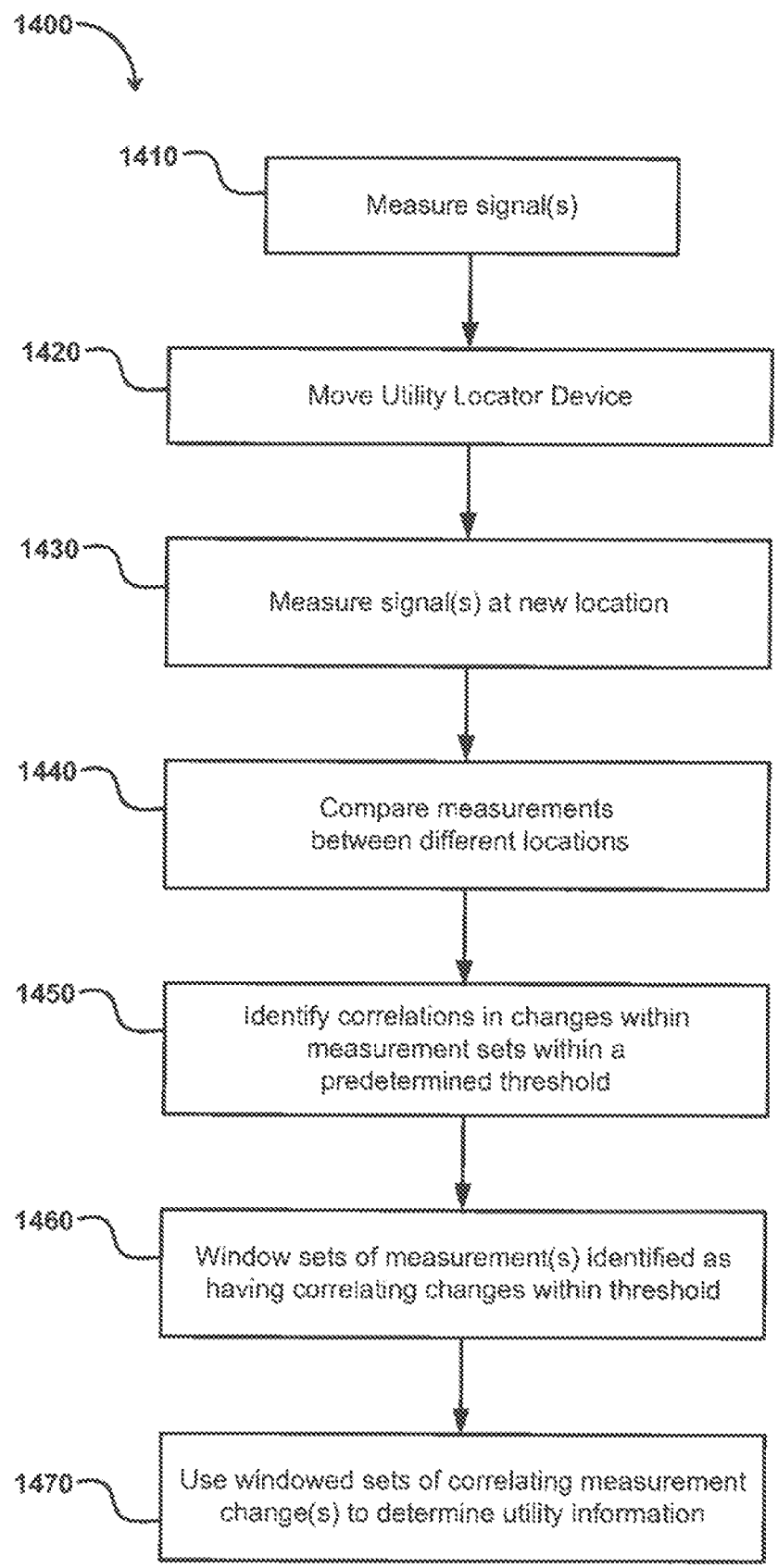
FIG. 14 illustrates details of an embodiment of a method for windowing correlating sets of signal measurements.

FIG. 14 illustrates a method embodiment 1400 for using signals at multiple frequencies to identify utilities. It step 1410, signals at one or more frequencies may be measured with a utility locator. In step 1420, the utility locator may be moved to another position in the locate area. In step 1430, a signal or signals are measured at the new location. Such measurements may include vector, gradient, and/or combined vector/gradient measurements that may further include measurements of absolute and/or relative phase at each frequency within the spectral signature. Such measurements may, in some embodiments, be in a polar coordinate system which may include polar angle measurements. In step 1440, signal measurements taken at different locations may be compared. In step 1450, correlations in changes within measurements sets to within a predetermined threshold may be identified.

As a utility locator is moved about the locate area, certain measurements at various frequencies may change in a correlated fashion. For example, the polar angle measurement of a signal at one frequency may change at relatively the same rate and/or direction to that of a signal at an adjacent frequency within the same frequency suite. These two frequencies may share the same signal generating source coupled to the same conductor within the ground.

As another example, correlations between frequencies may be based on the rate at which change occurs within signal measurements as the utility locator is moved about the locate area. For example, adjacent frequencies within a frequency suite that change in a correlated fashion indicative of a nearby buried utility may change at a faster rate than the rate of change within measurements of frequency of background power line harmonics. Phase measurements and/or vector and/or gradient and/or other signal measurement criteria may be used to identify such correlations.

In step 1460 windowing of a set or sets of measurements identified as having correlating changes to within threshold tolerances may be done. In step 1470, each windowed set may be used to base determinations of utility information on. Outlier frequencies where no correlation is found in the measurement may, in some embodiments, be considered error or inaccurate measurements and discarded. For example, a window set of correlated measurements indicative of a buried utility may be used to determine depth of the utility, while outlier frequency measurements outside the windowed set may be omitted when determining the utility line depth. In yet other embodiments, such outlier frequencies may be indicative of other locate information and be analyzed separately. In some embodiments, multiple windowed sets may be used, which may further indicate the presence of multiple signal sources within the locate environment.

Figure 15:
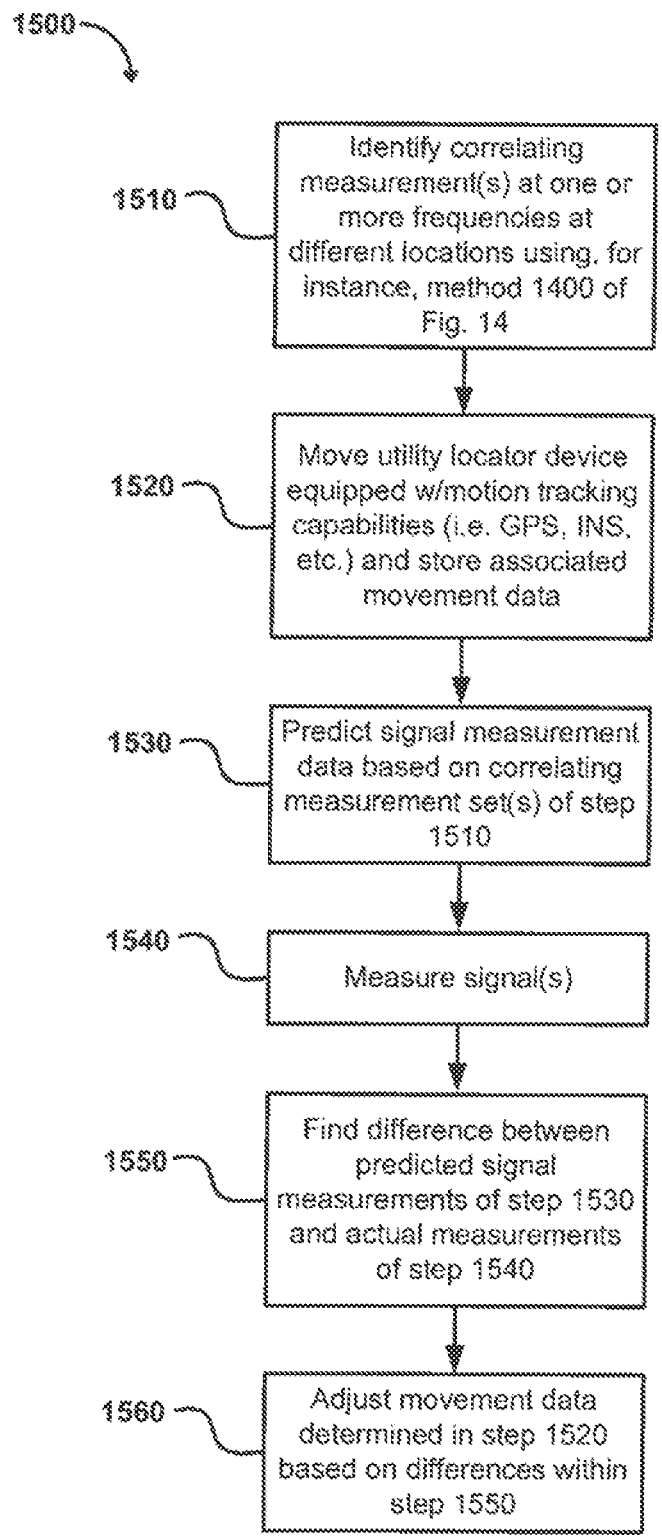
FIG. 15 illustrates details of an embodiment of a method for refining movement data based on changes in electromagnetic signal.

FIG. 15 illustrates a method embodiment 1500 to refine measurements of the utility locator movements about a locate area. Step 1510 may include correlating measurement(s) at one or more frequencies at different locations using, for example, method embodiment 1400 of FIG. 14. In step 1520, a utility locator equipped with motion tracking sensors or other motion tracking devices (e.g., GPS, inertial sensors, etc.) may be moved within the locate area.

The associated distance and direction of movement data as determined by the motion tracking sensors may be stored in a non-transitory memory of the locator. In step 1530, a prediction of signal measurements at the new location may be made based on correlating measurement set(s) from step 1510. In step 1540, a signal may be measured at the new location. In step 1550, difference between predicted signal measurements from step 1530 and actual measurements from step 1540 may be determined. In step 1560, adjustments to the movement data determined at step 1520 may be made based on differences determined in step 1550.

Figure 16:
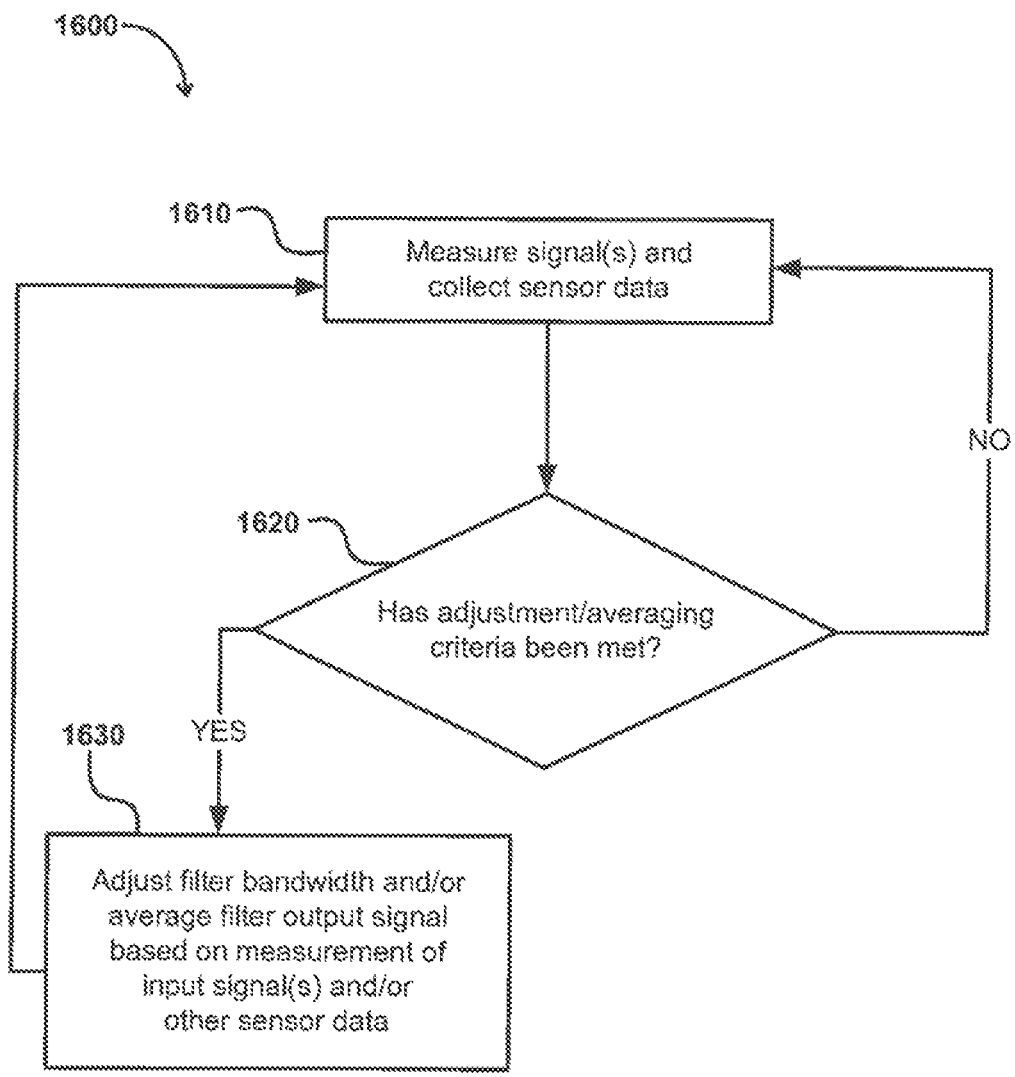
FIG. 16 illustrates details of an embodiment of a method for adjusting filter bandwidth and/or averaging of filter output signals based on utility locator movement and/or other adjustment/averaging criteria.

FIG. 16 illustrates a method embodiment 1600 for adjusting bandwidth filters and/or averaging filter output signals based on rate of movement of a utility locator and/or other criteria during a locate operation. In step 1610, the utility locator may measure the signal(s) and collect correlating sensor data simultaneously. Measurement of signal(s) may include passive and/or active frequency suite signals at various fundamental and/or harmonic frequencies. Sensor data may include, but is not limited to, sensor measurements from optical and/or mechanical ground tracking sensors/ devices, global navigation satellite systems (GNSS) such as Global Positioning Systems (GPS), inertial navigation systems (INS) and/or other motion or position tracking sensors, devices, and/or systems included on a utility locator. Details of example sensors, devices, and systems which may be used in various embodiments and methods thereof in conjunction with the disclosures associated with FIG. 16 are shown in the various incorporated patents and patent applications.

In step 1620, a decision may be made as to whether an adjustment/averaging criteria has been met based on the signal measurements and/or sensor data collected in step 1610. In some embodiments, the adjustment/averaging criteria may be dependent upon a change in location of the utility locator. For example, the distance of movement of the utility locator over a time period based on measurements/data of GNSS, INS, other motion/position tracking systems and sensors, and/or a change or lack of change in measured magnetic field signals at one or more component frequencies may define the adjustment/averaging criteria. In other embodiments, the adjustment/averaging criteria may be based on other sensor data and/or signal measurements other than those associated with the movement of the utility locator.

If the adjustment/averaging criteria is not met in decision step 1620, the method 1600 may return to step 1610. If the adjustment/averaging criteria is met in decision step 1620, in step 1630 adjustments to the bandwidth of filters and/or averaging of filter output signals based on measurements of input signals and/or other sensor data may be made. In some method embodiments, the rate by which the utility locator is moved may determine if, and to what extent, adjustments to the bandwidth of filters and/or averaging of outputs signals are made. For example, when the utility locator is slowed or stopped, a narrowing of filter bandwidth and/or a rolling average of the output signals from the filters may be used to improve signal quality. In some embodiments, meeting of the adjustment/averaging criteria may initiate both adjustments to the bandwidth of filters as well as an averaging of the output signal(s) from the filters. In other embodiments, meeting of the adjustment/averaging criteria may only initiate adjustments to the bandwidth of filters or averaging of the output signals from the filters. Following the adjustments/averaging of step 1630, the method 1600 may return to step 1610.

Figure 17:
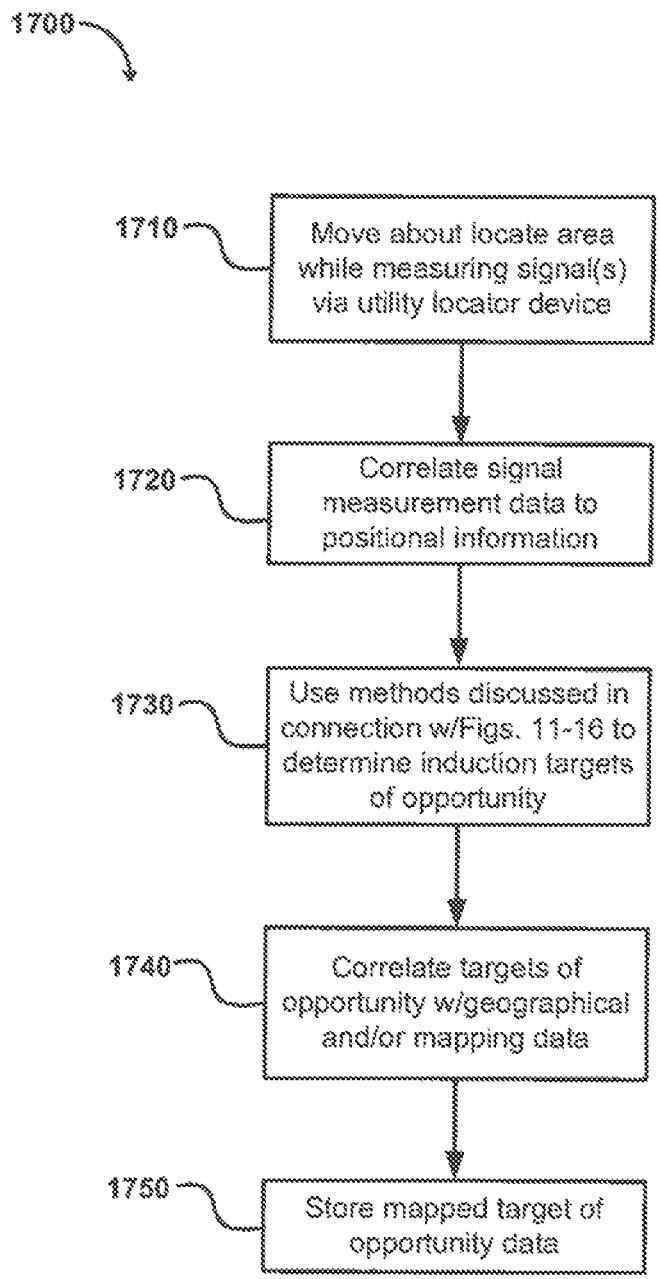
FIG. 17 illustrates details of an embodiment of a method for determining targets of opportunity from a spectral scan.

FIG. 17 illustrates a method embodiment 1700 for implementing a spectral scan of a locate area. In step 1710, a utility locator is moved about the locate area while measuring signals and positional data. In step 1720, signal measurements collected in step 1710 may be correlated to positional information collected simultaneously by the utility locator. Such positional information may be determined through optical ground tracking sensors/devices, global navigation satellite systems (GNSS) such as Global Positioning Systems (GPS), inertial navigation systems (INS) and/or sensors, and/or other such position/motion tracking devices/systems as are known or developed in the art. In step 1730, a "target of opportunity" may be determined. This may be done by, for example, using methods disclosed herein such as those illustrated in FIGS. 11-16.

As used herein, the term "targets of opportunity" refer to particularly identified sources of electromagnetic signal energy and/or noise and/or other electromagnetic/signal anomalies affecting the measurement of signal within the locate area. For example, the best available power line harmonic frequency or frequencies at a location (e.g., $2^{nd}$ or $3^{rd}$ harmonic, or other harmonics), an induction traffic signal loop, switching power line noise sources, and/or other sources of electromagnetic energy may be selected or determined as targets of opportunity.

In step 1740, determined targets of opportunity from step 1730 may be correlated with geographical and/or mapping data. The geographic or mapping data may be predetermined and loaded map data, image data, geographic vector data, etc. In step 1750, data associated with mapped targets of opportunity may be stored in a non-transitory memory of the locator and/or remotely. Storage mechanisms of mapped targets of opportunity may include a centralized database which may further be cloud storage further accessible by other utility locator devices and/or other computing devices. Such a spectral scan of the locate area and of potential targets of opportunity may be performed initially as a pre-locate operation and/or as a background process within the utility locator during a locate operation.

In various devices, systems, and/or method embodiments one or more of the methods 1100 of FIG. 11, 1200 of FIG. 12, 1300 of FIG. 13, 1400 of FIG. 14, 1500 of FIG. 15, 1600 of FIG. 16, and/or 1700 of FIG. 17 may be used. For example, all aforementioned methods may be combined and/or used concurrently and/or separately to determine utility information including, but not limited to, location, depth, and type of utility.

Figure 18:
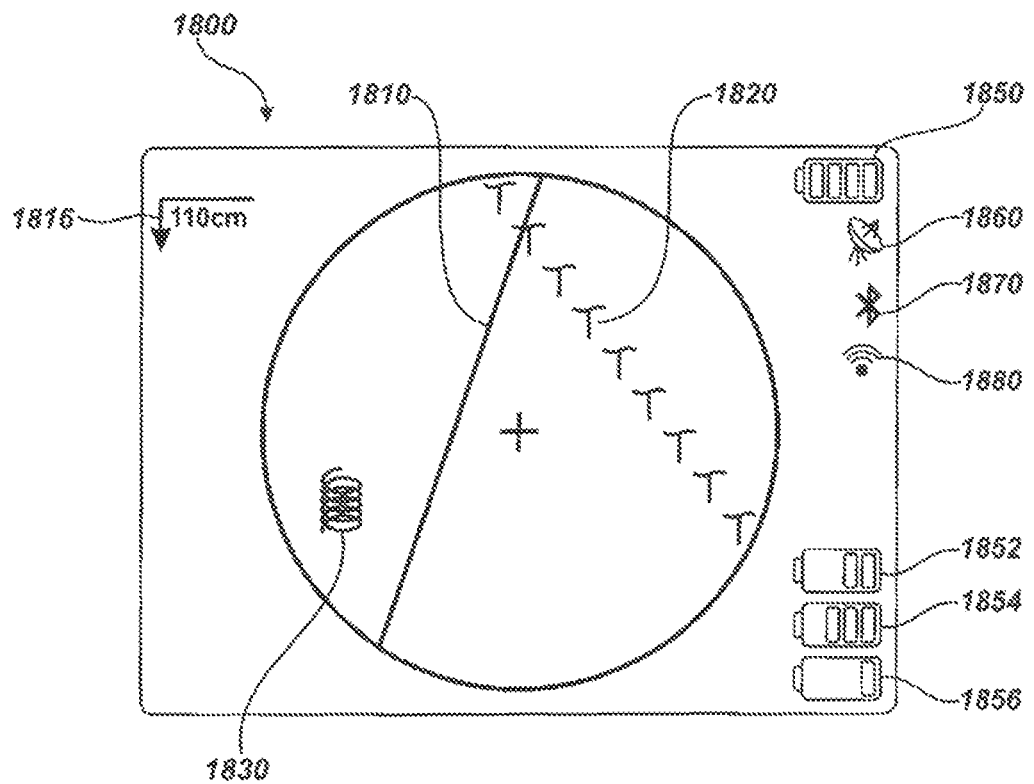
FIG. 18 illustrates details of an embodiment of a graphical interface displaying targets of opportunity as acquired from a prior spectral scan.

FIG. 18 illustrates an example use of targets of opportunity. Once determined, targets of opportunity from a spectral scan may be stored when collected, and then loaded to a locator for display and use in subsequent locate operations. For example, display 1800 of FIG. 18 includes a single line 1810 representative of a buried utility as shown on a utility locator UID display. Line 1810 may correspond to a depth gauge 1816 representative of the determined depth of the detected utility line. Display 1800 may further include one or more targets of opportunity presented on the display, such as, for example, overhead power lines 1820 (shown symbolically based on the previously determined data) and an induction traffic signal loop 1830 (shown symbolically as a coil).

Displayed targets of opportunity may be presented on the locator from data from a prior spectral scan collected, for example, by using a method such as method 1700 of FIG. 17 in the locate area during a previous survey or locate operation. During a locate operation where target of opportunity data is present from a prior spectral scan, collected signal measurements may further be refined based on signal measurements from the spectral scan. Additional spectral scans may be collected during the subsequent locate operation, and these may be stored in the locator and/or on cloud storage and/or other centralized database(s) on other computing or locating system devices as either locate data, additional targets of opportunity, or both.

Display 1800 may include additional indicators such as a locator battery gauge 1850. In addition, an array of connected device battery gauges 1852, 1854, and 1856 may be rendered on display 1800. Display 1800 may include other information from communicatively coupled devices such as, for example, a Global Navigation Satellite System (GNSS) connectivity indicator 1860, a Bluetooth connectivity indicator 1870, a wireless local area network (WLAN) connectivity indicator 1880, as well as other indicators (not shown).

Figure 19:
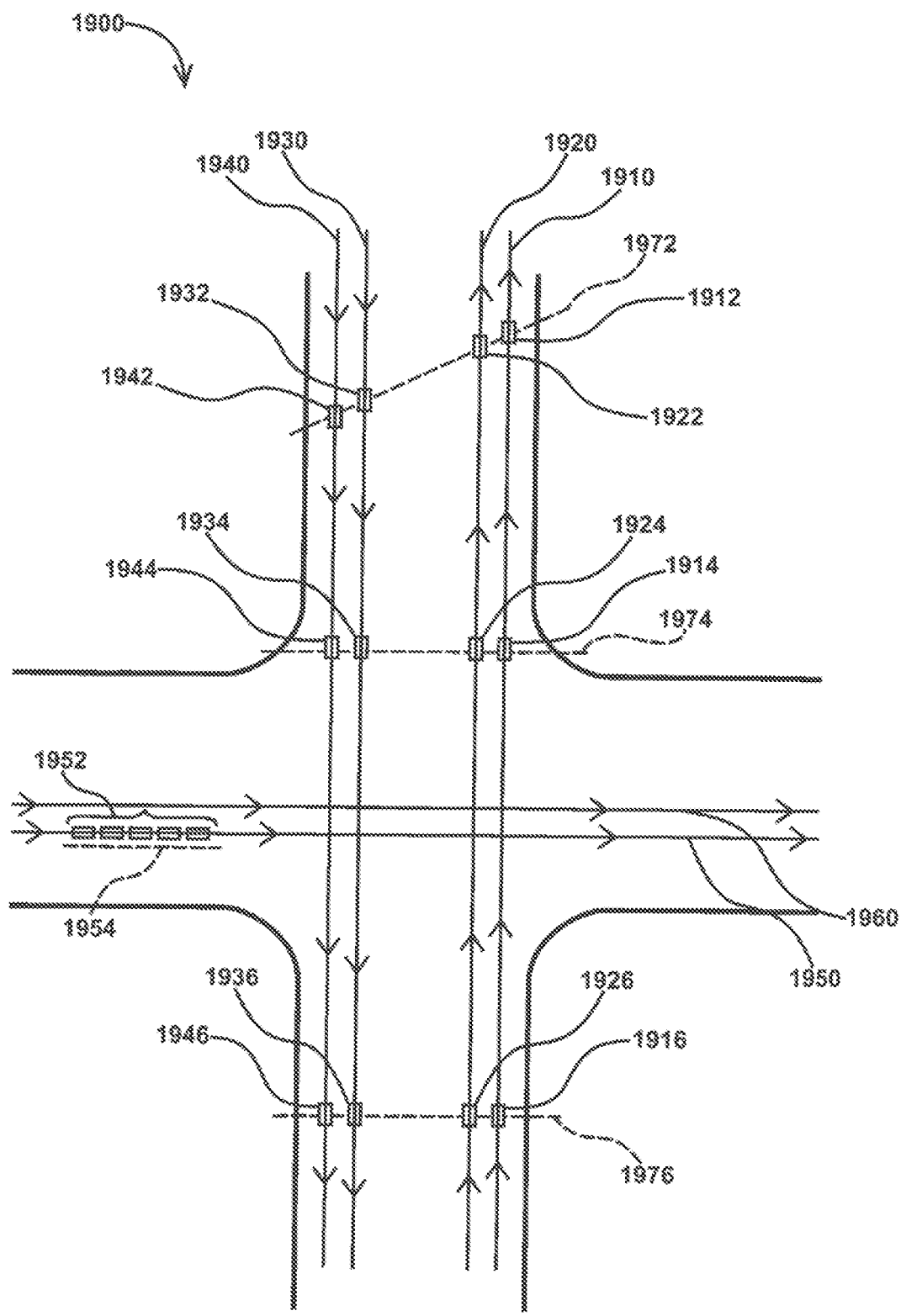
FIG. 19 is an illustration of an example locate operation demonstrating targets of opportunity along a spectral scan path.
Figure 20:
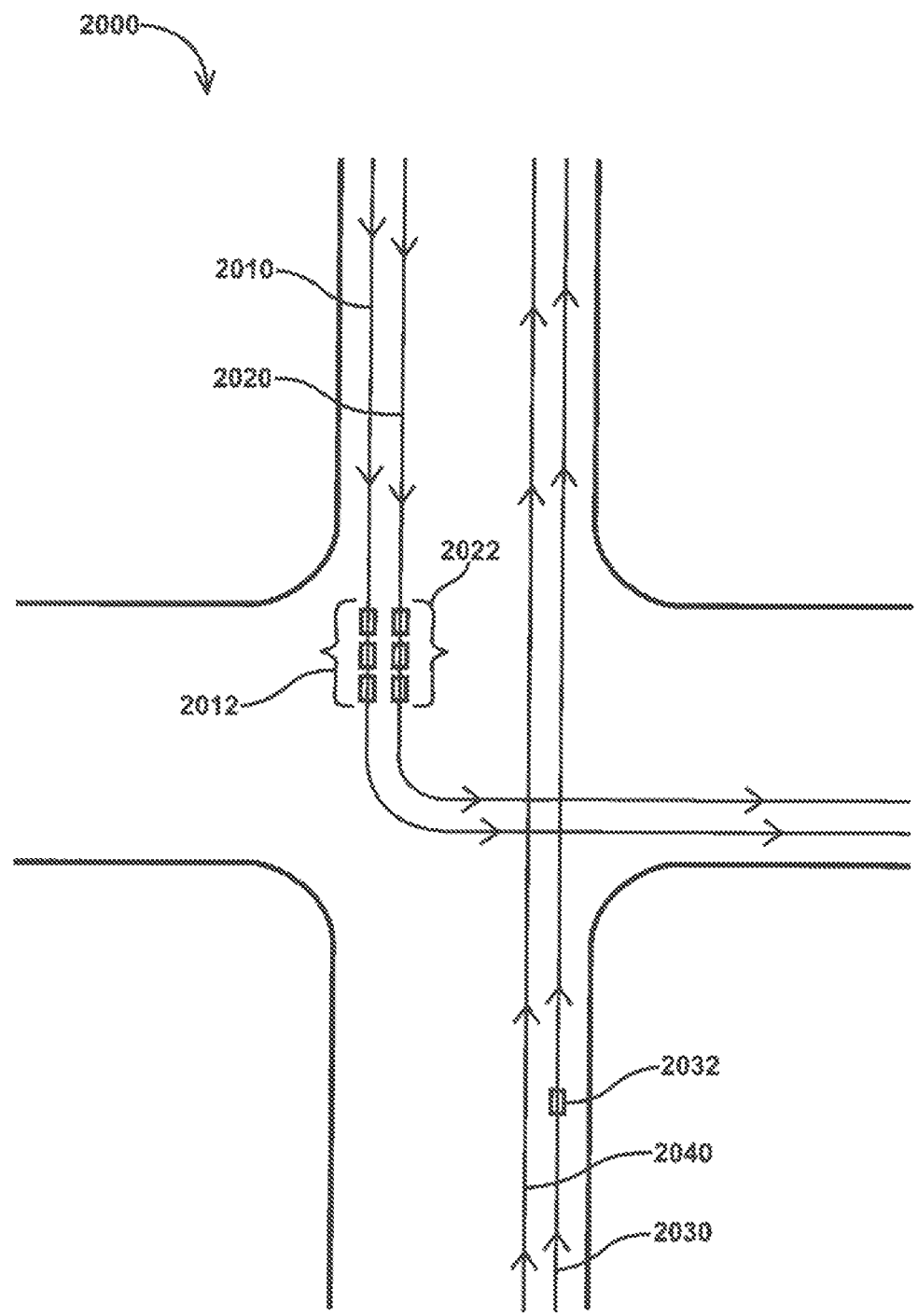
FIG. 20 is another illustration of an example locate operation demonstrating targets of opportunity along a spectral scan path.

FIG. 19 illustrates details 1900 of an example locate operation and associated collected data. The data may include a number of spectral scan paths 1910, 1920, 1930, 1940, 1950, and 1960 in which spectral scans have been made along the illustrated path lines. A series of targets of opportunity may be determined along each spectral scan path 1910, 1920, 1930, 1940, and 1950. For example, spectral scan path 1910 may have targets of opportunity 1912, 1914, and 1916. Spectral scan path 1920 may have targets of opportunity 1922, 1924, and 1926. Spectral scan path 1930 may have targets of opportunity 1932, 1934, and 1936. Spectral scan path 1940 may have targets of opportunity 1942, 1944, and 1946. Spectral scan path 1950 may find a cluster of targets of opportunity 1952 and a parallel spectral scan path 1960 that reveals no targets of opportunity.

Comparison of spectral scans at different targets of opportunity may be used to make a refined determination of location, depth, and/or type of utility/utilities and/or other conductors in the locate area. Such comparisons may be or may include principal component analysis (PCA, see, e.g., https://en.wikipedia.org/wiki/Principal_component_analysis as well as https://www.cs.princeton.edu/picasso/mats/PCA-Tutorial-Intuition_jp.pdf which are incorporated by reference herein), independent component analysis (ICA, see, e.g., https://en.wikipedia.org/wiki/Independent_component_analysis and https://sccn.ucsd.edu/~arno/indexica.html which are incorporated by reference herein), and/or other component analysis or correlation methods.

For example, correlation of spectral scans at targets of opportunity 1912, 1922, 1932, and 1942 may be used to determine a location of a utility line 1972. The correlation of spectral scan at targets of opportunity 1914, 1924, 1934, and 1944 may be used to determine a location of a utility line 1974. The correlation of spectral scans at targets of opportunity 1916, 1926, 1936, and 1946 may be used to determine the location of a utility line 1976. The utility lines 1972, 1974, and 1976 may each be determined from spectral scans along multiple spectral scan paths (e.g., spectral scan paths 1910, 1920, 1930, and 1940).

In some embodiments, utility line location and other data may be determined from one or more spectral scans along a single spectral scan path. For example, the cluster of target of opportunity 1952 along spectral scan path 1950 may be determined to show location and other data regarding utility line 1954 that may, in part, run in the same direction as along spectral scan path 1950. The spectral signature from utility line 1954 may fall off such that it may be spatially sharp and not be detected at a nearby parallel spectral scan path 1960.

In some embodiments, the sharpness or rate by which the measured signals within a target of opportunity falls off in space within a spectral scan may indicate information regarding a potential utility or other asset. For example, turning to FIG. 20, details 2000 of a locate operation include a number of spectral scan paths 2010, 2020, 2030, and 2040 in which spectral scans have been performed along the illustrated path lines. A target of opportunity may be determined along each spectral scan path 2010, 2020, and 2030. For example, spectral scan path 2010 may have a cluster of targets of opportunity 2012, spectral scan path 2020 may have a cluster of targets of opportunity 2022, and spectral scan path 2030 may have a target of opportunity 2032.

Through PCA and/or other component analysis or correlation methods the cluster of targets of opportunity 2012 along spectral scan path 2010 and cluster of targets of opportunity 2022 along spectral scan path 2020 may correlate to a like buried asset. For example, the target of opportunity clusters 2012 and 2022 may be from a dipole field source such as a traffic loop. The spectral signatures of the target of opportunity 2032 along spectral scan path 2030 may correlate to a field source for example, from a buried conductive pipe running along spectral scan path 2030. The target of opportunity 2032 may be spatially sharp with measured signals falling off faster in space than targets of opportunity from $1/R^3$ far field dipole sources such as the target of opportunity clusters 2012 and 2022. Information regarding each buried asset may be determined by the sharpness of measured signals within each target of opportunity.

Figure 21A:
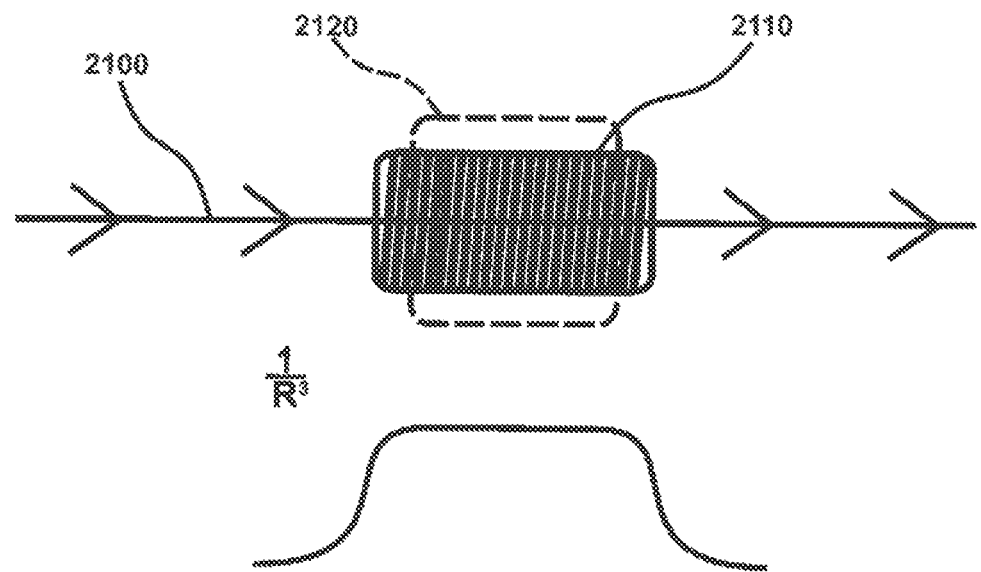
FIG. 21A is an illustration of an example target of opportunity along a spectral scan path with distinct edges.
Figure 21B:
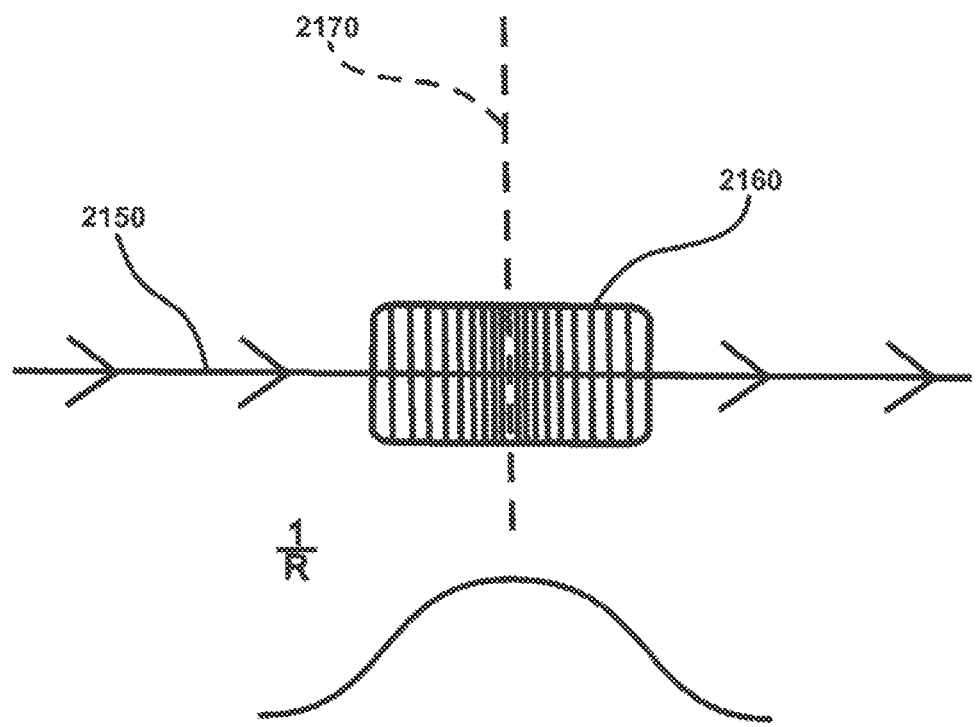
FIG. 21B is an illustration of an example target of opportunity along a spectral scan path wherein the measured spectral signature gradually transition.

As further illustrated in FIGS. 21A, a spectral scan along path 2100 may be used to identify a target of opportunity 2100. The distinct edges of the target of opportunity 2110 may be used to determine a traffic loop 2120. In the spectral scan illustrated within FIG. 21B along path 2150, the gradual transition of the target of opportunity 2160 may be used to determine a buried utility 2170.

In some embodiments, the apparatus, circuit, modules, and/or systems in this disclosure may include means for implementing features or providing functions as described herein. In one aspect, the aforementioned means may be a module comprising a processing element including a processor or processors, associated memory and/or other electronics in which embodiments of the invention reside, such as to implement signal processing, switching, transmission, or other functions to process and/or condition transmitter outputs, locator inputs, and/or provide other electronic functions described herein. These may be, for example, modules or apparatus residing in buried utility transmitters, locators, coupling apparatus, base stations, and/or other related equipment or devices.

In one or more exemplary embodiments, the electronic functions, methods, and processes described herein and associated with utility locators and associated devices may be implemented in hardware, software, firmware, or any combination thereof in one or more processing elements. If implemented in software, the functions may be stored on or encoded as one or more instructions or code on a computer-readable medium. Computer-readable media includes non-transitory computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions and/or data structures and that can be accessed by a computer processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that data, information, and signals, such as current signals, magnetic field signals, video and/or audio signals or data, control signals, or other signals or data may be represented using any of a variety of different technologies and techniques as are known or developed in the art. For example, data, instructions, commands, information, signals, bits, symbols, and chips that may be referenced throughout the above description may be represented by voltages, currents, electromagnetic waves, magnetic fields or particles, optical fields or particles, or any combination thereof.

Artisans may implement the described functionality in varying ways for each particular application, but such implementation decisions should not be interpreted as causing a departure from the spirit or scope of the present disclosure.

The various illustrative functions and circuits described in connection with the embodiments disclosed herein may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, ASICs, FPGAs, or other programmable devices in combination with the above, or any other such configuration of programmable devices as are known or developed in the art.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The presently claimed invention is not intended to be limited to the aspects shown and described previously herein, but should be accorded the full scope consistent with the disclosure herein and its equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein, but is to be accorded the widest scope consistent with the appended claims and their equivalents.

We claim:

1. A method for locating buried utilities in a locator, comprising:
    receiving, at a locator antenna array for receiving magnetic field signals radiated from a buried utility as a result of a current flowing therein, a first plurality of magnetic field signals at first predefined signal frequencies in a first predefined frequency suite;
    generating, in a receiver coupled to an output of the antenna array, a first receiver output signal including amplitude and/or phase information of a first two or more signal components in two or more simultaneously received signals of the first predefined frequency suite;
    generating, in a processing element coupled to the receiver, a first set of data associated with the two or more signal components of the first frequency suite;
    storing, in a non-transitory memory of the locator, the first set of data;
    receiving, at the antenna array for receiving magnetic field signals from a buried utility in two or more orthogonal directions, a second plurality of magnetic field signals at second predefined signal frequencies in a second predefined frequency suite;
    generating, in the receiver coupled to an output of the antenna array, a second receiver output signal including amplitude and/or phase information of second two or more signal components in two or more simultaneously received signals of the second predefined frequency suite;
    generating, in a processing element coupled to the receiver, a second set of data associated with the two or more signal components of the second predefined frequency suite; and
    storing, a non-transitory memory of the locator, the second set of data;
    wherein the first frequency suite comprises a signal component at a passive frequency and a signal component at an active frequency, and the first set of data is based on the passive frequency signal component and the active frequency signal component.

2. A method for locating buried utilities in a locator, comprising:
    receiving, at a locator antenna array for receiving magnetic field signals radiated from a buried utility as a result of a current flowing therein, a first plurality of magnetic field signals at first predefined signal frequencies in a first predefined frequency suite;
    generating, in a receiver coupled to an output of the antenna array, a first receiver output signal including amplitude and/or phase information of a first two or more signal components in two or more simultaneously received signals of the first predefined frequency suite;
    generating, in a processing element coupled to the receiver, a first set of data associated with the two or more signal components of the first frequency suite;
    storing, in a non-transitory memory of the locator, the first set of data;
    receiving, at the antenna array for receiving magnetic field signals from a buried utility in two or more orthogonal directions, a second plurality of magnetic field signals at second predefined signal frequencies in a second predefined frequency suite;
    generating, in the receiver coupled to an output of the antenna array, a second receiver output signal including amplitude and/or phase information of second two or more signal components in two or more simultaneously received signals of the second predefined frequency suite;

generating, in a processing element coupled to the receiver, a second set of data associated with the two or more signal components of the second predefined frequency suite; and storing, a non-transitory memory of the locator, the second set of data; and rendering information associated with the buried utility based on the first set of data and the second set of data on a display; wherein the first frequency suite comprises a signal component at a passive frequency and a signal component at an active frequency, and the first set of data is based on the passive frequency signal component and the active frequency signal component.

3. A method for locating buried utilities in a locator, comprising:

receiving, at a locator antenna array for receiving magnetic field signals radiated from a buried utility as a result of a current flowing therein, a first plurality of magnetic field signals at first predefined signal frequencies in a first predefined frequency suite;

generating, in a receiver coupled to an output of the antenna array, a first receiver output signal including amplitude and/or phase information of a first two or more signal components in two or more simultaneously received signals of the first predefined frequency suite;

generating, in a processing element coupled to the receiver, a first set of data associated with the two or more signal components of the first frequency suite;

storing, in a non-transitory memory of the locator, the first set of data;

receiving, at the antenna array for receiving magnetic field signals from a buried utility in two or more orthogonal directions, a second plurality of magnetic field signals at second predefined signal frequencies in a second predefined frequency suite;

generating, in the receiver coupled to an output of the antenna array, a second receiver output signal including amplitude and/or phase information of second two or more signal components in two or more simultaneously received signals of the second predefined frequency suite;

generating, in a processing element coupled to the receiver, a second set of data associated with the two or more signal components of the second predefined frequency suite; and storing, a non-transitory memory of the locator, the second set of data;

wherein the second frequency suite comprises a signal component at a passive frequency and a signal component at an active frequency, and the second set of data is based on the passive frequency signal component and the active frequency signal component.

4. A method for locating buried utilities in a locator, comprising:

receiving, at a locator antenna array for receiving magnetic field signals radiated from a buried utility as a result of a current flowing therein, a first plurality of magnetic field signals at first predefined signal frequencies in a first predefined frequency suite;

generating, in a receiver coupled to an output of the antenna array, a first receiver output signal including amplitude and/or phase information of a first two or more signal components in two or more simultaneously received signals of the first predefined frequency suite;

generating, in a processing element coupled to the receiver, a first set of data associated with the two or more signal components of the first frequency suite;

storing, in a non-transitory memory of the locator, the first set of data;

receiving, at the antenna array for receiving magnetic field signals from a buried utility in two or more orthogonal directions, a second plurality of magnetic field signals at second predefined signal frequencies in a second predefined frequency suite;

generating, in the receiver coupled to an output of the antenna array, a second receiver output signal including amplitude and/or phase information of second two or more signal components in two or more simultaneously received signals of the second predefined frequency suite;

generating, in a processing element coupled to the receiver, a second set of data associated with the two or more signal components of the second predefined frequency suite; and storing, a non-transitory memory of the locator, the second set of data;

wherein the generated data associated with the two or more signal components of the first predefined frequency suite or the generated data associated with the second two or more signal components of the second predefined frequency suite comprises separate depth information of the buried utility determined based on ones of the first or the second two or more signal components.

5. A method for locating buried utilities in a locator, comprising:

receiving, at a locator antenna array for receiving magnetic field signals radiated from a buried utility as a result of a current flowing therein, a first plurality of magnetic field signals at first predefined signal frequencies in a first predefined frequency suite;

generating, in a receiver coupled to an output of the antenna array, a first receiver output signal including amplitude and/or phase information of a first two or more signal components in two or more simultaneously received signals of the first predefined frequency suite;

generating, in a processing element coupled to the receiver, a first set of data associated with the two or more signal components of the first frequency suite;

storing, in a non-transitory memory of the locator, the first set of data;

receiving, at the antenna array for receiving magnetic field signals from a buried utility in two or more orthogonal directions, a second plurality of magnetic field signals at second predefined signal frequencies in a second predefined frequency suite;

generating, in the receiver coupled to an output of the antenna array, a second receiver output signal including amplitude and/or phase information of second two or more signal components in two or more simultaneously received signals of the second predefined frequency suite;

generating, in a processing element coupled to the receiver, a second set of data associated with the two or more signal components of the second predefined frequency suite; and storing, a non-transitory memory of the locator, the second set of data;

wherein the generated data associated with the two or more signal components of the first predefined frequency suite or the generated data associated with the second two or more signal components of the second predefined frequency comprises separate positional information of the buried utility relative to the locator determined based on ones of the first or the second two or more signal components.

6. The method of claim 4, wherein the generated data associated with the first two or more signal components and the second two or more signal components comprises separate depth information of the buried utility determined based on ones of the first two or more signal components and ones of the second two or more signal components.

7. The method of claim 4, wherein the generated data associated with the first two or more signal components and the second two or more signal components comprises separate position information of the buried utility determined based on ones of the first two or more signal components and ones of the second two or more signal components.

* * * * *